United States Patent
Wang et al.

(10) Patent No.: US 10,977,746 B1
(45) Date of Patent: *Apr. 13, 2021

(54) COMPUTER IMPLEMENTED METHODS SYSTEMS AND ARTICLES OF MANUFACTURE FOR SUGGESTION-BASED INTERVIEW ENGINE FOR TAX RETURN PREPARATION APPLICATION

(71) Applicant: Intuit Inc., Mountain View, CA (US)

(72) Inventors: Gang Wang, San Diego, CA (US); Kevin M. McCluskey, Carlsbad, CA (US); Alex G. Balazs, San Diego, CA (US); Matthew A. Lisowski, Ramona, CA (US)

(73) Assignee: Intuit Inc., Mountain View, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/502,863

(22) Filed: Jul. 3, 2019

Related U.S. Application Data

(63) Continuation of application No. 14/206,834, filed on Mar. 12, 2014, now Pat. No. 10,387,969.

(51) Int. Cl.
    *G06Q 40/00* (2012.01)
(52) U.S. Cl.
    CPC .................................. *G06Q 40/123* (2013.12)
(58) Field of Classification Search
    CPC ................................................... G06Q 40/123
    USPC .......................................................... 705/31
    See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,001,006 A | 3/1991 | Saito et al. |
| 5,006,998 A | 4/1991 | Yasunobu |
| 5,019,664 A | 5/1991 | Del Rossi et al. |
| 5,082,144 A | 1/1992 | Sundstrom |

(Continued)

FOREIGN PATENT DOCUMENTS

| | | |
|---|---|---|
| JP | 2002/117121 | 4/2002 |
| JP | 2005/190425 | 7/2005 |

(Continued)

OTHER PUBLICATIONS

"Snap it Tap it Done" (Year: 2014).*

(Continued)

*Primary Examiner* — Bruce I Ebersman
(74) *Attorney, Agent, or Firm* — DLA Piper LLP (US)

(57) ABSTRACT

Computer-implemented methods, system and computer program products for determining what to present to a user of a tax preparation application. A tax compliance or rule module receives runtime data of the electronic tax return and tax rules specifying tax authority requirements. The rule module executes at least one tax rule utilizing the runtime data to generate a non-binding suggestion, which is provided as an input to loosely coupled interface controller. The interface controller determines content of an interview screen for display to the user based at least in part upon factors including the non-binding suggestion, and presents the interview screen including the determined content to the user via a user interface. The content may or may not include content based on the non-binding suggestion depending on processing by the interface controller.

20 Claims, 18 Drawing Sheets

(56) References Cited

U.S. PATENT DOCUMENTS

| | | | |
|---|---|---|---|
| 5,417,596 A | 5/1995 | Kusakabe | |
| 5,495,607 A | 2/1996 | Pisello et al. | |
| 5,557,761 A | 9/1996 | Chan et al. | |
| 5,607,353 A | 3/1997 | Hutchings et al. | |
| 5,673,369 A | 9/1997 | Kim | |
| 5,690,854 A | 11/1997 | Brueckner et al. | |
| 5,742,836 A | 4/1998 | Turpin et al. | |
| 5,788,412 A | 8/1998 | Jatkar | |
| 5,813,178 A | 9/1998 | Edwards | |
| 5,819,231 A | 10/1998 | Tremaine et al. | |
| 5,819,249 A | 10/1998 | Dohanich | |
| 6,078,898 A | 6/2000 | Davis | |
| 6,269,355 B1 | 7/2001 | Grimse et al. | |
| 6,334,110 B1 | 12/2001 | Walter et al. | |
| 6,473,741 B1 | 10/2002 | Baker | |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,651,217 B1 | 11/2003 | Kennedy | |
| 6,670,969 B1 | 12/2003 | Halstead et al. | |
| 6,690,854 B2 | 2/2004 | Helbing | |
| 6,697,787 B1 | 2/2004 | Miller | |
| 6,850,924 B2 | 2/2005 | Grimse et al. | |
| 6,898,573 B1 | 5/2005 | Piehl | |
| 6,912,508 B1 | 6/2005 | McCalden | |
| 6,925,441 B1 | 8/2005 | Jones et al. | |
| 7,234,103 B1 | 6/2007 | Regan | |
| 7,295,998 B2 | 11/2007 | Kulkarni | |
| 7,331,045 B2 | 2/2008 | Martin et al. | |
| 7,340,679 B2 | 3/2008 | Botscheck et al. | |
| 7,448,022 B1 | 11/2008 | Ram et al. | |
| 7,539,635 B1 | 5/2009 | Peak et al. | |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison et al. | |
| 7,716,094 B1 | 5/2010 | Sutter et al. | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,805,349 B2 | 9/2010 | Yu | |
| 7,818,222 B2 | 10/2010 | Allanson et al. | |
| 7,849,405 B1 | 12/2010 | Coletta | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 | 4/2011 | Banks | |
| 8,001,006 B1 * | 8/2011 | Yu | G06Q 20/207 705/19 |
| 8,019,664 B1 | 9/2011 | Tifford | |
| 8,082,144 B1 | 12/2011 | Brown et al. | |
| 8,086,970 B2 | 12/2011 | Achtermann et al. | |
| 8,108,258 B1 | 1/2012 | Slattery | |
| 8,109,499 B2 | 2/2012 | Griese et al. | |
| 8,126,820 B1 | 2/2012 | Talan | |
| 8,190,499 B1 | 5/2012 | McVickar | |
| 8,204,805 B2 | 6/2012 | Eftekhari et al. | |
| 8,224,726 B2 | 7/2012 | Murray | |
| 8,234,562 B1 | 7/2012 | Evans | |
| 8,244,607 B1 | 8/2012 | Quinn | |
| 8,306,885 B2 * | 11/2012 | Brose | G06Q 40/00 705/35 |
| 8,346,635 B1 * | 1/2013 | Olim | G06Q 40/12 705/30 |
| 8,346,680 B2 * | 1/2013 | Castleman | G06F 9/453 706/11 |
| 8,370,795 B1 | 2/2013 | Sage | |
| 8,386,344 B2 | 2/2013 | Christina | |
| 8,407,113 B1 | 3/2013 | Eftekhari et al. | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,583,516 B1 | 11/2013 | Pitt et al. | |
| 8,589,262 B1 | 11/2013 | Wang | |
| 8,607,353 B2 | 12/2013 | Rippert | |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 | 4/2014 | Houseworth | |
| 8,706,580 B2 | 4/2014 | Houseworth | |
| 8,732,057 B1 * | 5/2014 | Becker | G06Q 40/06 705/36 T |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,930,253 B1 * | 1/2015 | Ball | G06Q 40/00 705/36 R |
| 8,949,270 B2 | 2/2015 | Newton et al. | |
| 9,372,687 B1 | 6/2016 | Pai | |
| 9,406,089 B2 | 8/2016 | Mori | |
| 9,690,854 B2 | 6/2017 | Stent et al. | |
| 9,760,953 B1 | 9/2017 | Wang et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 10,580,089 B2 | 3/2020 | Mori | |
| 10,614,526 B2 | 4/2020 | Mori | |
| 2002/0023064 A1 | 2/2002 | Grimse et al. | |
| 2002/0065831 A1 | 5/2002 | DePaolo | |
| 2002/0107698 A1 | 8/2002 | Brown et al. | |
| 2002/0107824 A1 | 8/2002 | Ahmed | |
| 2002/0111888 A1 | 8/2002 | Stanley et al. | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1 | 4/2004 | Morano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0172347 A1 | 9/2004 | Barthel | |
| 2004/0181543 A1 | 9/2004 | Wu et al. | |
| 2004/0205008 A1 | 10/2004 | Haynie et al. | |
| 2005/0171822 A1 | 8/2005 | Cagan | |
| 2005/0192823 A1 | 9/2005 | Kuhn et al. | |
| 2005/0216379 A1 | 9/2005 | Ozaki | |
| 2005/0262191 A1 | 11/2005 | Mamou et al. | |
| 2006/0112114 A1 | 5/2006 | Yu | |
| 2006/0155618 A1 | 7/2006 | Wyle | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |
| 2006/0293990 A1 | 12/2006 | Schaub | |
| 2007/0011036 A1 | 1/2007 | Lo | |
| 2007/0033116 A1 | 2/2007 | Murray | |
| 2007/0033117 A1 | 2/2007 | Murray | |
| 2007/0033130 A1 | 2/2007 | Murray | |
| 2007/0055571 A1 | 3/2007 | Fox et al. | |
| 2007/0094207 A1 | 4/2007 | Yu et al. | |

(56) References Cited

U.S. PATENT DOCUMENTS

| | | |
|---|---|---|
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0071673 A1 | 3/2008 | Howard |
| 2008/0097878 A1 | 4/2008 | Abeles |
| 2008/0126170 A1 | 5/2008 | Leck et al. |
| 2008/0141247 A1 | 6/2008 | Saravanan |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0112807 A1 | 4/2009 | Bahn |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0057659 A1 | 3/2010 | Phelon et al. |
| 2010/0063981 A1 | 3/2010 | Thomsen |
| 2010/0088124 A1 | 4/2010 | Diefendori et al. |
| 2010/0131394 A1 | 5/2010 | Rutsch et al. |
| 2010/0153138 A1 | 6/2010 | Evans |
| 2010/0161379 A1 | 6/2010 | Bene et al. |
| 2010/0179916 A1 | 7/2010 | Johns et al. |
| 2011/0004537 A1 | 1/2011 | Allanson et al. |
| 2011/0078062 A1 | 3/2011 | Kleyman |
| 2011/0099063 A1 | 4/2011 | Clemmons |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth et al. |
| 2012/0005209 A1 | 1/2012 | Rinearson et al. |
| 2012/0016817 A1 | 1/2012 | Smith et al. |
| 2012/0027246 A1 | 2/2012 | Tifford et al. |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari et al. |
| 2012/0109793 A1 | 5/2012 | Abeles |
| 2012/0136764 A1 | 5/2012 | Miller et al. |
| 2012/0173295 A1 | 7/2012 | Phelon et al. |
| 2012/0215669 A1 | 8/2012 | Lieberman et al. |
| 2012/0278365 A1 | 11/2012 | Labat et al. |
| 2012/0296768 A1 | 11/2012 | Fremont-Smith et al. |
| 2012/0323749 A1 | 12/2012 | Lapidus |
| 2013/0036347 A1 | 2/2013 | Eftekhari et al. |
| 2013/0046603 A1 | 2/2013 | Grigg et al. |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula et al. |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014/206960 | 10/2014 |
| KR | 10-2012-0011987 | 2/2012 |
| WO | WO 2017/004094 | 1/2017 |
| WO | WO 2017/004095 | 1/2017 |
| WO | WO 2017/019233 | 2/2017 |
| WO | WO 2017/116496 | 7/2017 |
| WO | WO 2017/116497 | 7/2017 |
| WO | WO 2018/022023 | 2/2018 |
| WO | WO 2018/022128 | 2/2018 |
| WO | WO 2018/080562 | 5/2018 |
| WO | WO 2018/080563 | 5/2018 |

OTHER PUBLICATIONS http://en.wikipedia.org/wiki/Loose_coupling, printed Mar. 11, 2014, 2 pages.

http://www.webopedia.corniTERM/Uloose_coupling.html, printed Mar. 11, 2014, 4 pages.

http://doc.jboss.org/drools/release/5.3.0.Final/drools-expert-docs/html/ch01.html, printed Mar. 11, 2014, 10 pages.

http://en.wikipedia.org/wiki/Declarative_programming, printed Mar. 11, 2014, 4 pages.

http://en.wikipedia.org/wiki/Drools, printed Mar. 11, 2014, 4 pages.

http://quicken.intuit.com/support/help/income-and-expenses/how-to-assign-tax-form-line-items-to-a-category/GEN82142.html, updated Aug. 11, 2011, printed Jun. 24, 2014, 2 pages.

http://quicken.intuit.com/support/help/reports--graphs-and-snapshots/track-the-earnings-taxes--deductions--or-deposits-from-paychecks/GEN82101.html, updated May 14, 2012, printed Jun. 24, 2014, 2 pages.

http://quicken.intuit.com/support/help/tax-savings/simplify-tax-time/INF24047.html, updated Jul. 25, 2013, printed Jun. 24, 2014, 11 pages.

http://www.jboss.org/drools/drools-expert.html, printed Mar. 11, 2014, 5 pages.

https://turbotax.intuit.com/snaptax/mobile/, printed Mar. 11, 2014, 2 pages.

NY State Dep of Taxation, NY State Personal Income Tax MeF Guide for Software Developers, 2012, NY State, 30 pages.

OpenRules, Preparing a Tax Return Using OpenRules Dialog, Aug. 2011, 25 pages.

Wikipedia, https://en.wikipedia.org/wikaree_(data_structure), "Tree (data structure)", May 15, 2005, 1 page.

Wikipedia, https://en.wikipedia.org/wiki/Data_structure, "Data Structures", Jan. 12, 2012, 1 page.

(56) References Cited

OTHER PUBLICATIONS

Vanderbilt University, "Free tax prep help available for Vanderbilt employees", Feb. 6, 2014, Vanderbilt University, p. 1-3 [NPL-1].
http://www.wisegeek.com/what-is-declarative-programming.htm, printed Mar. 11, 2014, 2 pages.
https://developers.facebook.com/docs/marketing-api/overview, printed Feb. 6, 2015, 5 pages.
https://developers.facebook.com/docs/marketing-apis, printed Feb. 6, 2015, 3 pages.
https://developers.facebook.com/docs/marketing-apis/using-the-api, printed Feb. 6, 2015, 2 pages.
H.R. Gregg; Decision Tables for Documentation and System Analysis; Oct. 3, 1967; Union Carbide Corporation, Nuclear Division, Computing Technology Center: (Year: 1967), 25 pages.
Solomon L. Pollack; Analysis of the Decision Rules in Decision Tables, May 1963; The Rand Corporation, 78 Pages.
U.S. Appl. No. 13/923,266, filed Jun. 20, 2013.
U.S. Appl. No. 14/462,345, filed Jul. 31, 2014.
U.S. Appl. No. 14/448,962, filed Jul. 31, 2014.
U.S. Appl. No. 14/448,986, filed Jul. 31, 2014.
U.S. Appl. No. 14/448,922, filed Jul. 31, 2014.
U.S. Appl. No. 14/555,543, filed Nov. 26, 2014.
U.S. Appl. No. 14/555,334, filed Nov. 26, 2024.
U.S. Appl. No. 14/555,296, filed Nov. 26, 2014.
U.S. Appl. No. 14/673,646, filed Mar. 30, 2015.
U.S. Appl. No. 14/555,222, filed Nov. 26, 2014.
U.S. Appl. No. 16/148,506, filed Oct. 1, 2018.
U.S. Appl. No. 16/188,442, filed Nov. 13, 2018.
U.S. Appl. No. 16/154,434, filed Oct. 8, 2018.
U.S. Appl. No. 16/266,754, filed Feb. 4, 2019.
U.S. Appl. No. 16/262,698, filed Jan. 30, 2019.
U.S. Appl. No. 13/923,266, filed Jun. 20, 2013 Pending.
U.S. Appl. No. 14/462,345, filed Jul. 31, 2014 Abandoned.
U.S. Appl. No. 14/448,962, filed Jul. 31, 2014 Pending.
U.S. Appl. No. 14/448,986, filed Jul. 31, 2014 Pending.
U.S. Appl. No. 14/448,922, filed Jul. 31, 2014 Pending.
U.S. Appl. No. 14/555,543, filed Nov. 26, 2014 Issued.
U.S. Appl. No. 14/555,334, filed Nov. 26, 2014 Pending.
U.S. Appl. No. 14/555,296, filed Nov. 26, 2014 Issued.
U.S. Appl. No. 14/673,646, filed Mar. 30, 2015 Issued.
U.S. Appl. No. 14/555,222, filed Nov. 26, 2014 Pending.
U.S. Appl. No. 16/148,506, filed Oct. 1, 2018 Pending.
U.S. Appl. No. 16/188,442, filed Nov. 13, 2018 Pending.
U.S. Appl. No. 16/154,434, filed Oct. 8, 2018 Pending.
U.S. Appl. No. 16/266,754, filed Feb. 4, 2019 Pending.
U.S. Appl. No. 16/262,698, filed Jan. 30, 2019 Pending.
U.S. Appl. No. 14/448,922, filed Jul. 31, 2014 (Feb. 19, 2020 to present).
U.S. Appl. No. 16/188,442, filed Nov. 13, 2018 (May 24, 2020 to present).
Partial Image File Wrapper History of U.S. Appl. No. 16/188,442 filed Nov. 13, 2018 captured from PAIR dated Jan. 4, 2021 (Oct. 1, 2020-present).
Partial Image File Wrapper History of U.S. Appl. No. 16/154,434 filed Oct. 8, 2018 captured from PAIR dated Jan. 4, 2021 (Oct. 1, 2020-present).
Partial Image File Wrapper History of U.S. Appl. No. 16/262,698 filed Jan. 30, 2019 captured from PAIR dated Mar. 3, 2021 (Jan. 5, 2021-present).
Partial Image File Wrapper History of U.S. Appl. No. 16/154,434 filed Oct. 8, 2018 captured from PAIR dated Jan. 4, 2021 (Jan. 5, 2021-present).

\* cited by examiner

COMPUTER IMPLEMENTED METHODS SYSTEMS AND ARTICLES OF MANUFACTURE FOR SUGGESTION-BASED INTERVIEW ENGINE FOR TAX RETURN PREPARATION APPLICATION

CROSS-REFERENCE TO RELATED APPLICATION

This application is a continuation of U.S. application Ser. No. 14/206,834, filed Mar. 12, 2014, entitled COMPUTER IMPLEMENTED METHODS SYSTEMS AND ARTICLES OF MANUFACTURE FOR SUGGESTION-BASED INTERVIEW ENGINE FOR TAX RETURN PREPARATION APPLICATION, the contents of which is incorporated herein by reference in its entirety.

BACKGROUND

Embodiments of the invention relate to electronic interview methods, systems and computer program products, which may utilized as part of an interview engine of a tax preparation application operable to prepare electronic tax returns.

Tax return preparation programs have become very popular and allow a user, such as an individual, taxpayer, accountant, or tax professional, to prepare and electronically file a tax return using a computer. Known tax preparation programs present a list of tax-related questions or data entry fields to the user as a series of interview screens or fillable forms. In certain tax preparation applications, the sequence of questions or interview screens presented is based on a pre-determined, programmed question-and-answer tree structure. As a simplified example, the programmed tree structure may dictate that if the user answers Question 1 with Answer A, then an interview engine proceeds to Question 2, else if the user answers Question 1 with Answer B, then the interview engine proceeds to Question 3, and so on according to the programmed tree structure. Thus, as the user enters data or responds to certain questions, the tree structure remains the same, and the tree structure dictates which questions to ask next or which interview screen or sequence of screens to present next.

For example, in an individual tax return, certain interview screens or questions may involve personal and family matters such as name, address, social security number, marital status, number of dependents, etc. Other interview screens and questions may involve financial matters such as wages, retirement plan contributions, and social security, state and federal taxes paid or withheld as provided in Form-W2, charitable contributions, mortgage interest paid, property tax paid, etc. The electronic tax return may also be a business or corporate return with business related income and expense items. After entry of the data, the electronic tax return prepared by the preparation application is formatted as necessary and filed (e.g., electronically filed) with a tax authority such as the Internal Revenue Service (IRS), state tax authority, or other tax collecting entity.

While tax preparation applications have been used effectively in the past to prepare and file millions of electronic tax returns with tax authorities, tax preparation applications that rely upon a pre-determined, programmed question-and-answer tree structure are rigid and lack of flexibility in how questions are identified for presentation to users. This pre-determined structure also limits how the tax return preparation application can be modified and expanded.

Further, given the manner in which data is entered into fields of interview screens generated by known tax preparation applications, there may be instances in which a user enters the wrong data or makes an error, but errors may not be identified by the tax preparation application since they may merely provide a field in which data is entered. For example, it is not uncommon for manually entered data to be wrong for various reasons including human error, defective keyboards and issues with programs and files. Human error may involve typographical errors such as pressing the wrong number, pressing a number one too many or one to few times, pressing two keys inadvertently, inserting a comma in the wrong place, inserting a decimal point in the wrong place, or simply entering correctly typed data in the wrong field. Similar errors may be caused by programs or files that do not operate as intended or that have corrupted data or problems with data that is imported from another program or file. Known tax preparation applications may not be able to identify these errors and instead the user must identify them, but they may be subtle and difficult to identify while still having a significant impact on the end result, particularly if there are multiple errors.

SUMMARY

Embodiments are directed to new tax preparation application interview engine frameworks that are not limited by pre-defined question-and-answer tree structures.

Embodiments are also directed to a suggestion-based tax preparation application utilizing a declarative knowledge base. Suggestions can be determined by performing an analysis of runtime data relative to rules that involve, for example, compliance with requirements of a tax authority, statistical data of taxpayers generally, electronic tax return data of other users of a tax preparation application, errors or inconsistencies within an electronic tax return, and/or whether a question is independent or constrained by a pre-determined semantic dependency or dependent upon an answer of another question.

Embodiments are also directed to modular interview engines of tax preparation applications. For example, certain embodiments may involve incorporation of a personalization module that can be added to the interview engine to generate, modify or filter suggestions based on statistical data or data of other users of the tax preparation application that share one or more attributes with the current user of the tax preparation application system.

Embodiments are also directed to determining which questions to present to a user of tax preparation application utilizing a rule module and an interface controller that are loosely coupled together. In this manner, a result or suggestion of what to present or ask the user generated by the rule module is a non-binding or non-controlling factor or consideration utilized by the interface controller to determine the content or question of an interview screen presented to the user of a tax preparation application. The interface controller is not bound by the suggestion such that the interface controller can determine whether and/or when to present content within an interview screen based on the suggestion. Further, the rule module can generate multiple suggestions for different tax topics on the fly or during runtime, and these multiple suggestions can then be resolved or processed by the interface controller, which can determine whether and/or when to incorporate suggestions into interview screens presented to a user.

Embodiments are further directed to utilizing configuration files for resolving or determining how to process suggestions generated by a rule module and whether and when to process suggestions generated by the rule module.

Embodiments are also directed to presenting content to a user of tax preparation application regarding potential or actual issues within an electronic tax return during preparation of the electronic tax return, e.g., on the spot during presentation of an interview screen, rather than waiting to address issues during a "final review" stage in response to a user clicking an error check or final review menu item within an interview screen generated by the tax preparation application.

Certain embodiments are also directed to a tax preparation application that can execute rules, which may involve one or more or all of rules involving compliance with tax authority requirements, identifying potential or actual errors or inconsistencies, and determining questions that are free from semantic dependencies for the purpose of generating non-binding suggestions. Embodiments can execute rules to generate suggestions for processing by an interface controller without having to refer to a pre-determined question-and-answer hierarchical tree structure.

Other embodiments are directed to a tax preparation application that can personalize what is presented to the interface controller and to particular users. Personalization may involve, for example, adapting a tax preparation application experience or content of an interview screen based on one or more current user attributes such as the current user's occupation, income and marital status. This data is used to identify other users of the tax preparation application having attributes that match that of the current user, and electronic tax return data of those other users is accessed to generate suggestions of what to ask or present to the current user for processing by the interface controller. Statistical data of other taxpayers may also be utilized for personalization purposes. Further, embodiments may also involve suggestions based, for example, on one or more or all of tax compliance, statistical data and personalization.

Certain embodiments are also directed to an inferential tax preparation application or interview engine thereof that can process runtime data to generate suggestions of which topics, questions or issues should be presented to the user of the tax preparation application.

Embodiments are also directed to processing suggestions involving identified issues with an electronic tax return such as data entry errors, data inconsistency, and incomplete fields in real time as they are identified. For example, when an error or inconsistency is identified by the rule module, the interface controller can immediately present an interview screen concerning the error or inconsistency rather than waiting to perform error checks at the end of preparation of the electronic tax return in response to user selection of a final menu option for same.

Certain embodiments are also directed to generating an interview screen during runtime if a suggestion generated by a rule module cannot be addressed using a library of available interview screens. Runtime interview screen generation may involve the interface controller selecting a screen from the library or populating an interview screen template with words or phrases pertaining to the suggestion and displaying the interview screen template to the user.

One embodiment is directed to a computer-implemented method for determining content or an interview screen to present to a user of a tax preparation application operable to prepare an electronic tax return and comprises a computer executing a rule module that receives runtime data of the electronic tax return and rules. The rules may be rules that specify how requirements of a tax authority are satisfied.

The computer executes at least one rule utilizing the runtime data to generate a non-binding suggestion. The method further comprises the computer executing an interface controller that receives the non-binding suggestion as an input, determines an interview screen or content thereof for display to the user based at least in part upon factors including the non-binding suggestion, and presents the interview screen including the determined content to the user.

Another embodiment is directed to computer-implemented method for determining content to present to a user of a tax preparation application operable to prepare an electronic tax return and comprises a computer executing a rule module that receives runtime data of the electronic tax return and rules. The rules may, for example, specify how requirements of a tax authority are satisfied. The rule module executes at least one rule utilizing the runtime data to generate a non-binding suggestion. The computer executes an interface controller loosely coupled to the rule module and that receives the non-binding suggestion generated by the rule module as an input. The interface controller determines content of an interview screen for display to the user based at least in part upon factors including the non-binding suggestion and without reference to a pre-determined question-and-answer hierarchical tree structure, and presents the interview screen as part of a user interface presented to the user.

A further embodiment is directed to a computer-implemented method for determining content to present to a user of a tax preparation application operable to prepare an electronic tax return, the method being performed by an interface controller in communication with a rule module that receives runtime data of the electronic tax return and rules, e.g., rules specifying how requirements of a tax authority are satisfied, and that executes at least one rule utilizing the runtime data to generate a non-binding suggestion. The method comprises the interface controller receiving the non-binding suggestion generated by the rule module an input, determining content for an interview screen to display to the user based at least in part upon factors including the non-binding suggestion. This determination is made without reference to a pre-determined question-and-answer hierarchical tree structure. The method further comprises the computer generating the interview screen, which may be selected from a library of visual assets including pre-programmed interview screens including determined content.

Other embodiments are directed to computerized systems or computerized interview engines configured or operable to determine which interview screens to present to a user during preparation of an electronic tax return. For example, one embodiment of a system may comprise a rule module and an interface controller in communication with the rule and loosely coupled thereto. The rule module is configured to receive runtime data of the electronic tax return and rules. The rules, for example, may specify how requirements of a tax authority are satisfied, how to check for errors or consistency of data in the electronic tax return and/or how to identify potential questions to ask based on an analysis of semantic dependency. The rule module is further configured to execute at least one rule utilizing the runtime data and generate a non-binding suggestion. The interface controller is configured or operable to receive the non-binding suggestion as an input, determine an interview screen or content thereof for display to the user based at least in part upon factors including the non-binding suggestion, and present the interview screen including the determined content to the user. Other systems may comprise only a rule module or only an interface controller configured or operable according to embodiments. Other system embodiments may also comprise at least one additional module, such as a personalization module, which can be used to process non-binding suggestions generated by the rule module. For example, a personalization module may determine statistical data that applies to the user or determine questions of other users that share a common attribute with the current user to prioritize questions that are the subject of a non-binding suggestion. The personalization module may also be configured or operable to modify text of a non-binding suggestion generated by the rule module so the text is more relevant or personalized to the user.

Another embodiment is directed to a computer-implemented method for identifying a question to present to a user of a tax preparation application during preparation of an electronic tax return and comprises a computer receiving runtime data of the electronic tax return, wherein respective fields for respective questions presented by the tax preparation application are populated with respective data, and determining which questions of the tax preparation application remain unanswered after receiving the data. The method further comprises identifying a plurality of unanswered questions free of pre-determined semantic dependency upon an answer to at least one tax preparation application question, and selecting at least one identified unanswered question of the plurality of identified unanswered questions for presentation to the user during preparation of the electronic tax return.

A further embodiment is directed to a computer-implemented method for identifying a question to present to a user of a tax preparation application during preparation of an electronic tax return, the method being executed by a computer and comprising executing a rule module that receives runtime data of the electronic tax return and a plurality of rules, executes at least one rule utilizing the runtime data to determine which questions of the tax preparation application remain unanswered after receiving the runtime data, identifies a plurality of unanswered questions free of pre-determined semantic dependency upon an answer to at least one tax preparation application question, selects at least one identified unanswered question of the plurality of identified unanswered questions for presentation to the user during preparation of the electronic tax return, and generates a result comprising a non-binding suggestion based at least in part upon the at least one identified unanswered question. The method further comprises the computer executing an interface controller that receives the non-binding suggestion as an input, determines content of an interview screen for display to the user based at least in part upon factors including the non-binding suggestion, and presents the interview screen including the determined content to the user.

Yet another embodiment is directed to a computer-implemented method for identifying a question to present to a user of a tax preparation application during preparation of an electronic tax return and comprises a computer executing a rule module that receives runtime data of the electronic tax return and a plurality of rules, executes at least one rule utilizing the runtime data to determine which questions of the tax preparation application remain unanswered after receiving the runtime data, identifies a plurality of unanswered questions free of pre-determined semantic dependency upon an answer to at least one tax preparation application question, selects at least one identified unanswered question of the plurality of identified unanswered questions for presentation to the user during preparation of the electronic tax return, and generates a result comprising a non-binding suggestion based at least in part upon the at least one identified unanswered question. The method further comprises the computer executing an interface controller that receives the non-binding suggestion as an input, determines content of an interview screen for display to the user based at least in part upon factors including the non-binding suggestion, and presents the interview screen including the determined content to the user.

Yet other embodiment is directed to systems that resolve semantic dependency to determine which questions can be presented to the user or be the subject of a non-binding suggestion provided to an interface controller for processing. One system comprises a computerized interview engine of a tax preparation application operable to prepare an electronic tax return that is programmed or configured to receive runtime data of the electronic tax return that populates respective fields for respective questions presented by the tax preparation application, determine which questions of the tax preparation application remain unanswered after receiving the runtime data, identify a unanswered questions free of pre-determined semantic dependency upon an answer to at least one tax preparation application question, and select at least one identified unanswered question of the plurality of identified unanswered questions for presentation to the user during preparation of the electronic tax return. Other system embodiments involve systems including a rule module and an interface controller. The rule module is programmed or configured to resolve semantic dependencies by being programmed or configured to receive runtime data and a plurality of rules, execute at least one rule utilizing the runtime data to determine which questions of the tax preparation application remain unanswered after receiving the runtime data, identify a plurality of unanswered questions free of pre-determined semantic dependency upon an answer to at least one tax preparation application question, select at least one identified unanswered question of the plurality of identified unanswered questions for presentation to the user during preparation of the electronic tax return, and generate a result comprising a non-binding suggestion based at least in part upon the at least one identified unanswered question. The non-binding suggestion is provided as an input to the interface controller, which is programmed or configured to determine content of an interview screen for display to the user based at least in part upon factors including the non-binding suggestion, and present the interview screen including the determined content to the user.

Yet other embodiments are directed to how identified errors or inconsistencies are processed before an error check is requested by the user, e.g., "on the spot" or in real time such as when the error or inconsistency is identified or during an interview screen that is currently displayed. Error or inconsistency messages can also be presented during another interview screen that is displayed before an error check is requested by the user. One embodiment is directed to a computer-implemented method for notifying a user about an error or inconsistency within an electronic tax return, the method being performed by a computer and comprises the computer executing a rule module that receives data and executes at least one rule utilizing the received data, determines an error or inconsistency within the electronic tax return based at least in part upon executing the at least one rule, and generates at least one non-binding suggestion based at least in part upon the error or inconsistency. The method further comprises the computer executing an interface controller, in communication with the rule module, that receives the at least one non-binding suggestion, determines a message based at least in part upon the at least one non-binding suggestion, and presents the message to the user before the user requests that the electronic tax return be checked for errors.

Further embodiments are directed to how error messages and non-binding suggestions, e.g., those based on identified errors or other matters, are communicated from a rule module to an interface controller.

According to one embodiment, this involves a "push" method in which a rule module executing at least one rule utilizing runtime data to generate non-binding suggestions pushes at least one non-binding suggestion of the plurality off non-binding suggestions to an interface controller. The interface controller then determines content of an interview screen for display to the user based at least in part upon factors including the non-binding suggestion, and presents the interview screen including the determined content to the user. The rule module may push non-binding suggestions or error messages as they are generated or determined, periodically, or as a group (which may include all non-binding suggestions, or non-binding suggestions selected by the rule module according to a pre-determined priority, for example).

Another embodiment involves a "pull" method in which a rule module executes at least one rule utilizing runtime data to generate non-binding suggestions, and an interface controller pulls at least one non-binding suggestion from the rule module, determines content of an interview screen for display to the user based at least in part upon factors including the non-binding suggestion, and presents the interview screen including the determined content to the user.

Other embodiments involve a "shared memory" method in which a rule module executes at least one rule utilizing runtime data to generate non-binding suggestions and pushes at least one non-binding suggestion to a data store shared with an interface controller. The interface controller pulls at least one non-binding suggestion from the shared data store, determines content of an interview screen for display to the user based at least in part upon factors including the non-binding suggestion, and presents the interview screen including the determined content to the user.

Further embodiments are directed to articles of manufacture or computer program products comprising a non-transitory computer readable medium embodying instructions which, when executed by a computer, execute a process for implementing method embodiments.

In a single or multiple embodiments, rules are executed by a rule engine such as a drools expert rule engine. The rule engine may also be another declarative rule engine. The rule engine utilizes runtime data that may be one or more of data that is manually entered by the user into a field of a prior interview screen or of the electronic tax return, data imported into a field of a prior interview screen or of the electronic tax return from an external source such as an electronic file of a financial management system, data extracted from a photograph of a tax document or determined using a recognition process, and data that is a result of a calculation performed by the tax preparation application.

In a single or multiple embodiments, a knowledge base is generated and stored in a data store accessed by the rule module. The knowledge base includes tax rules and canonical data of a first schema or model that specifies tax-related terms or concepts recited in rules which, for example, declare requirements of the tax authority involving the terms or concepts of the first schema. In the event that other or external data in a different schema is received, e.g., a photograph of a tax document, data is extracted from the photograph, e.g., using a recognition process such as Optical Character Recognition (OCR), and that extracted data in a second schema is converted or transformed into data of the first schema. Thus, at runtime, data provided to the rule module is in the first schema, and includes runtime canonical data which is an instantiated representation of the canonical tax model defining tax related concepts or derived from an external source such as a photograph.

In a single or multiple embodiments, the rule module and the interface controller are loosely coupled to each other such that the non-binding suggestion generated by the rule module does not control or dictate how the interface controller determines the content of the interview screen. In other words, while the rule module may provide suggestions to the interface controller, the interface controller determines how to process the suggestions, e.g., if, when and how they are processed. Thus, while these components work together and are loosely coupled to each other, they retain a sense of autonomy and independence in terms of their functionality and decision making abilities.

In a single or multiple embodiments, the framework of the interview engine of the tax preparation application involves the interface controller determining whether to include content based on the non-binding suggestion within the interview screen during runtime without reference to a pre-determined question-and-answer hierarchical tree structure or a pre-determined sequence of questions and instead make determinations about what to present to a user by use of a rule-based system that generates non-binding suggestions that are then processed by the interface controller. Thus, there may be cases in which the resulting interview screen generated by the interface controller does not include content based on the non-binding suggestion generated by a rule module as result of executing a rule with runtime data, or the interface controller may determine to include the suggestion immediately, or in a subsequent interview screen, without requiring the user to request an error check, e.g., by selecting a final review menu item. This may be based on how the interface controller is internally configured or programmed, or based on execution of an external configuration file that instructs the interface controller how to process a non-binding suggestion. Thus, the modular architecture in which the rule module and execution of rules is loosely coupled to or separated from the interface controller provides a tax preparation application framework that is flexible and that can adapt to changing runtime data to generate suggestions and interview screens that would have otherwise been "out of sequence" compared to interview screens presented according to a pre-determined question-and-answer tree structure.

In a single or multiple embodiments, a configuration file is utilized by the interface controller to determine how to process a non-binding suggestion generated by the rule module. For example, the interface controller may access a data store comprising a plurality of configuration files and search for a configuration file applicable to the received non-binding suggestion based on a keyword or other identifier of the non-binding suggestion. When a configuration file is identified as being applicable to the received non-binding suggestion, the configuration file is executed by the interface controller, and a result of the configuration file execution indicates how the non-binding suggestion should be processed, e.g., if processed and when processed to present to the user, the content of the message or screen presented to the user. If no configuration file is identified, an interview screen can be generated by the interface controller on-the-fly using a template and populating a pre-determined section or field the template with a word or phrase pertaining to the suggestion.

In a single or multiple embodiments, the interface controller includes a resolution module, a generator module and an interview screen management module. The resolution module determines how to resolve non-binding suggestions or how to process the non-binding suggestions, e.g., utilizing a configuration file. The generator module receives a result or output of the resolution module and submits a query to the interview screen management module for an available pre-configured interview screen. The resolution module may also provide the output or result to the interview screen management module directly. In response to the query or in response to receiving the output or result generated by the resolution module, the interview screen management module accesses a data store including a library of available pre-configured interview screens and identifies or selects a pre-configured interview screen stored in the data store, or selects a pre-configured sequence of interview screens, in response to the query and provides the identified or selected interview screen(s) to the generator module. The generator module outputs the identified or selected interview screen(s) to the user interface for presentation to the user.

According to embodiments, the suggestion generated by the rule module is non-binding or does not control the interface controller, which may consider one or more other factors in determining whether, when and/or how content of the suggestion should be incorporated into an interview screen and presented to the user. For example, the form factor of the computing device may dictate that more limited content is presented within a single screen, thus limiting the content of the suggestions or requiring a sequence of multiple interview screens, compared to a form factor of a larger display. The interface controller may also consider temporal or sequential factors, e.g., as specified by a configuration file, in order to determine when content corresponding to a non-binding suggestion will be presented or an order or priority of non-binding suggestions, e.g., immediately or in real time during a current interview screen, after a current interview screen and before the next interview screen, or during the next interview screen or during a subsequent interview screen. This is done without requiring the user to request an error check. The interface controller may also determine to wait until a final review, e.g., depending on whether other data is received. Thus, this may result in certain suggestions being displayed before others or displaying interview screens incorporating some but not all of the non-binding suggestions, and such content being in a sequence that differs from a pre-determined tree structure.

In a single or multiple embodiments, the non-binding suggestion generated by the rule module, or generated by or modified by another module such as a personalization module, is a message or "hint" that notifies the interface controller of a potential action item involving runtime data. The potential action item may be a potential error, e.g., potential typographical error caused by a "fat finger" typing error or pressing of the wrong key for example such that the same data does not appear in multiple fields for that same data, a potential incomplete field or inconsistency or run time data of the electronic tax return, a potential priority of suggested interview questions to present to the user and a potential relevancy of a topic or question to runtime data.

In a single or multiple embodiments, a personalization module modifies or filters at least one non-binding suggestion generated by the rule module, or indicates how suggestions may be ranked or prioritized in terms of their relevancy to attributes of the user and/or statistics of other users of the tax preparation application, which may be determined by mining electronic tax return data of other users.

In a single or multiple embodiments involving analysis of semantic dependency, some or all of the unanswered questions that are free of semantic dependency are selected, and a sequence for the selected unanswered questions is determined for presentation to the user. The sequence may be a random sequence, e.g., as determined by a random sequence generator or according to some pre-determined priority. According to embodiments, the sequence, however determined, is determined during preparation of the electronic tax return, or in real time or on the spot, before the data resulting in the non-binding suggestions is received and before unanswered questions that are free of semantic dependency are identified or selected. The process is iterative as additional runtime data is received, e.g., as additional fields of an electronic tax return are populated or additional calculations are performed, such that the determinations regarding which questions of the tax preparation application remains unanswered and which ones are free of semantic dependency are repeated as additional data is received or data is changed. Thus, it may be that one or more questions previously unanswered and previously identified as not being free of semantic dependency after prior runtime data was received, is then determined to be free of pre-determined semantic dependency after receiving the additional runtime data such that the question can be the subject of a non-binding suggestion.

In a single or multiple embodiments, the an unanswered question is determined to be free of pre-determined semantic dependency based at least in part upon the unanswered question being associated with an answered question, the answer to which satisfies pre-determined answer criteria. If an unanswered question is associated with multiple questions, the semantic dependency remains intact if all pre-determined criteria is not satisfied. For example, an unanswered question is free of pre-determined semantic dependency based at last in part upon the unanswered question being associated with a plurality of answered questions and respective answers to all respective answered questions satisfying respective pre-determined criteria, but the semantic dependency would still apply if one or more answers to associated questions do not satisfy pre-determined criteria. According to embodiments, these determines are made based on associations among questions and pre-determined criteria involving answers to questions with reference to a data structure other than a pre-determined hierarchical tree structure, e.g., by use of a model or data structure based on a table or directed graph specifying associations or links between questions and pre-determined criteria that must be satisfied in order for a question to be determined to be free of semantic dependency upon an answer to an associated question.

According to one embodiment, determinations or resolution of semantic dependency is performed within an interview engine that identifies an unanswered question free of semantic dependency as a possible or candidate question eligible to be presented to the user, or the basis of a non-binding suggestion generated by a rule module and communicated to an interface controller loosely coupled to or in communication with the rule module.

In single or multiple embodiments, a message or indicator of an error or inconsistency, e.g., as generated or determined by a rule module, is based at least in part upon data received by the rule module being inconsistent with data previously entered in a field of the electronic tax return. This may involve a rule that is executed to refer to certain electronic tax return fields and data for comparing previously entered and recently received numerical and/or text data, or the number of digits or characters of data previously entered versus the number of digits or characters of recently received data for a field of the same type, e.g., if social security number was entered before, but social security number entered thereafter into a different form was not the same as the number previously entered.

In a single or multiple embodiments, the inconsistency involves different tax-related statuses. For example, the user may have entered data or checked a box indicating a first tax status, but in a different part of the electronic tax return, checked a box or entered data indicating a different status. Or, the user may have completed one portion of the electronic tax return but not another field or form that must be completed in view of the other field or form that was previously completed.

In a single or multiple embodiments, a message or non-binding suggestion concerning an error or inconsistency can be processed on the spot or immediately, e.g., a message is generated and presented to the user in response to receiving the message or during a currently displayed interview screen, before the interface controller presents a next interview screen to the user. In other embodiments, the interface controller may generate and/or present a message about the error or inconsistency during subsequent interview screen, e.g., during display of the next interview screen or other screen. In embodiments, these errors or inconsistencies are addressed without requiring the user requests an error check or review, e.g., an error check menu item.

In a single or multiple embodiments, all non-binding suggestions based on an error or inconsistency are pushed to the interface controller, which determines whether and how to process the plurality of non-binding suggestions, e.g., according to a configuration file or pre-determined priority.

In a single or multiple embodiments, the interface controller determines an interview screen that is currently displayed, which may involve the interface controller maintaining a table of currently displayed indicators such as a flag, and submits a query or requests a non-binding suggestion from the rule module. The non-binding suggestion may involve an error, inconsistency or other result of executing a rule. The rule module responds with one or more applicable non-binding suggestions, which are processed by the interface controller such that, for example, a message regarding an error or inconsistency is displayed during the currently displayed interview screen or during a subsequent interview screen as determined by respective flags such as the next interview screen or after a currently displayed screen is no longer displayed (e.g., the user has completed a form or navigated away from that screen). This may occur for each screen displayed, and may also be based on tax topic rather than individual screens, e.g., the interface controller queries the rule module for when a new tax topic is reviewed, which may involve multiple interview screens to address that topic, and then a non-binding suggestion can be addressed during one of the interview screens pertaining to that topic.

DETAILED DESCRIPTION OF THE DRAWINGS

Figure 6:
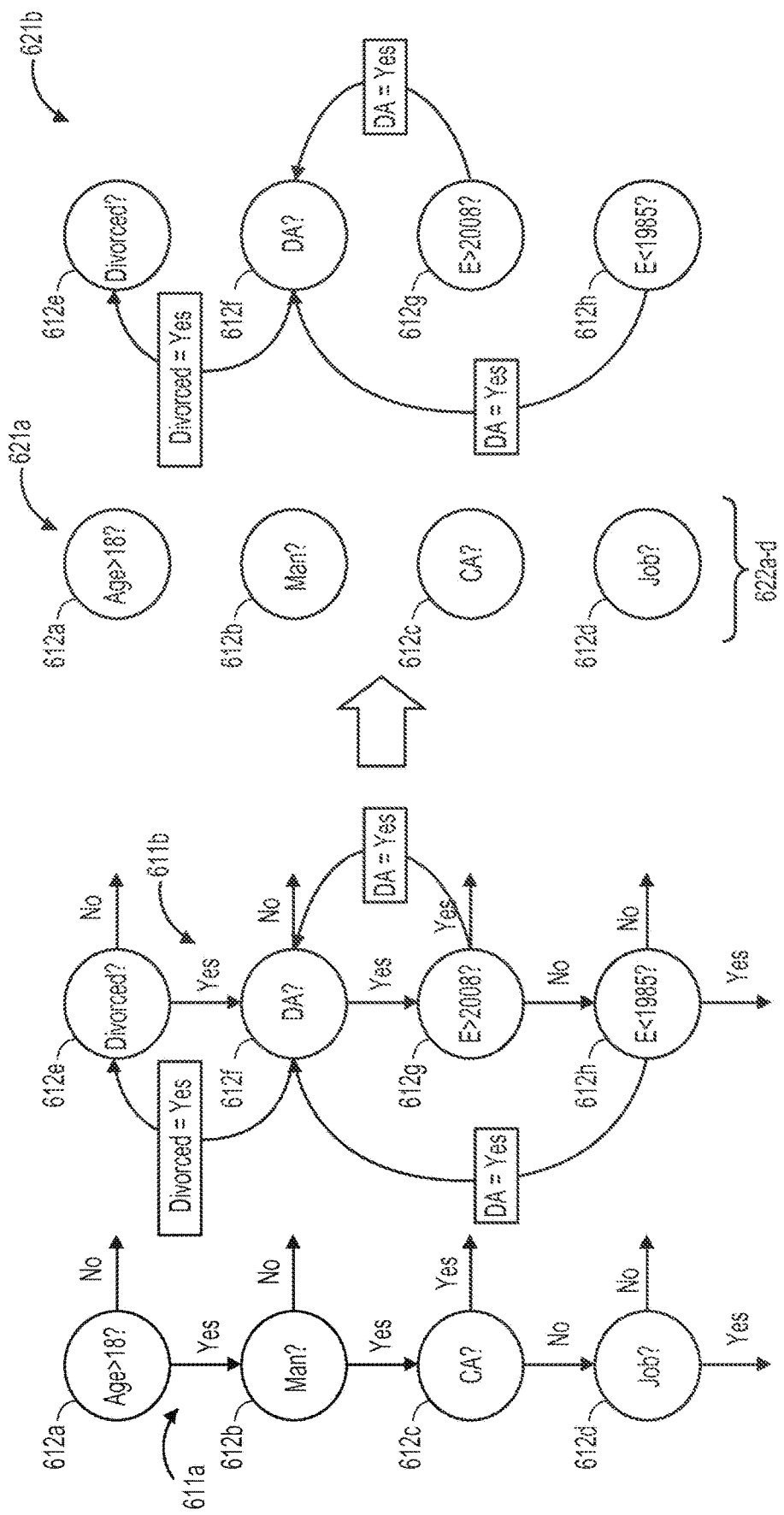
Figure 7:
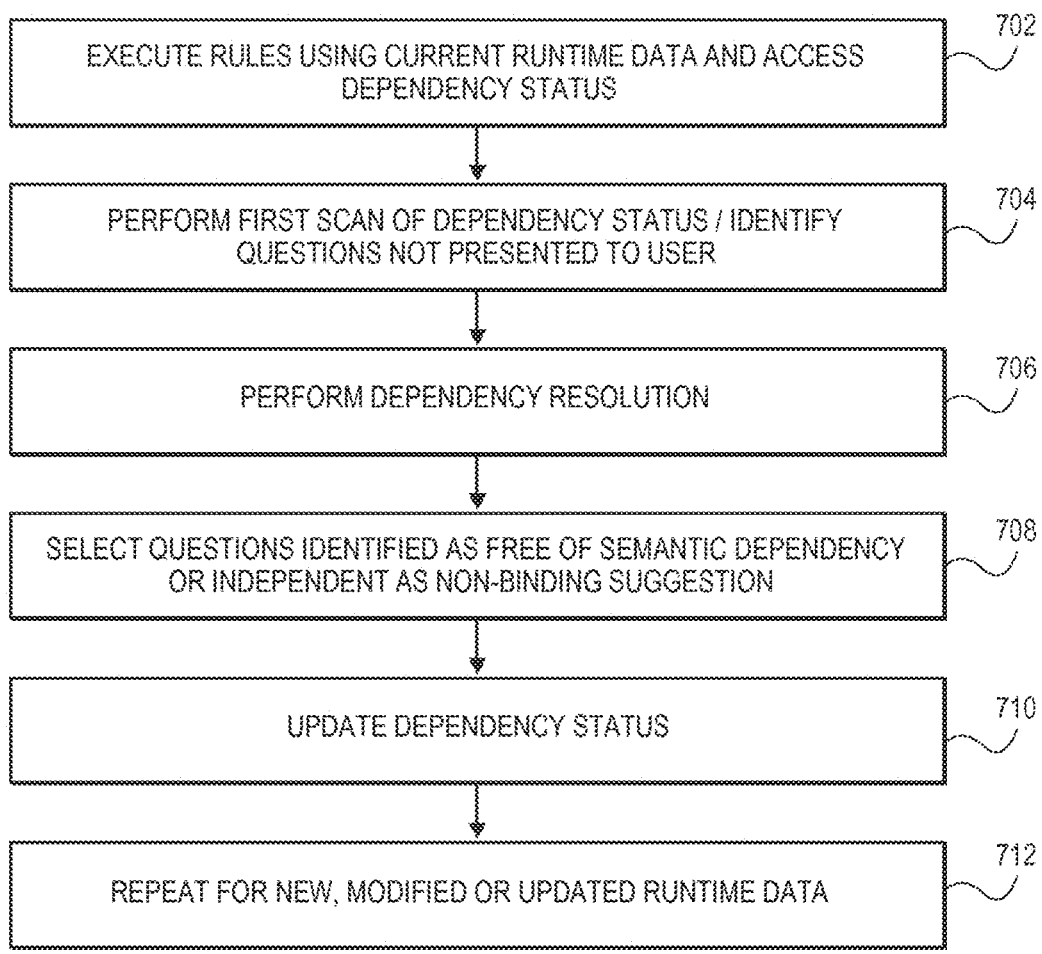
Figure 8:
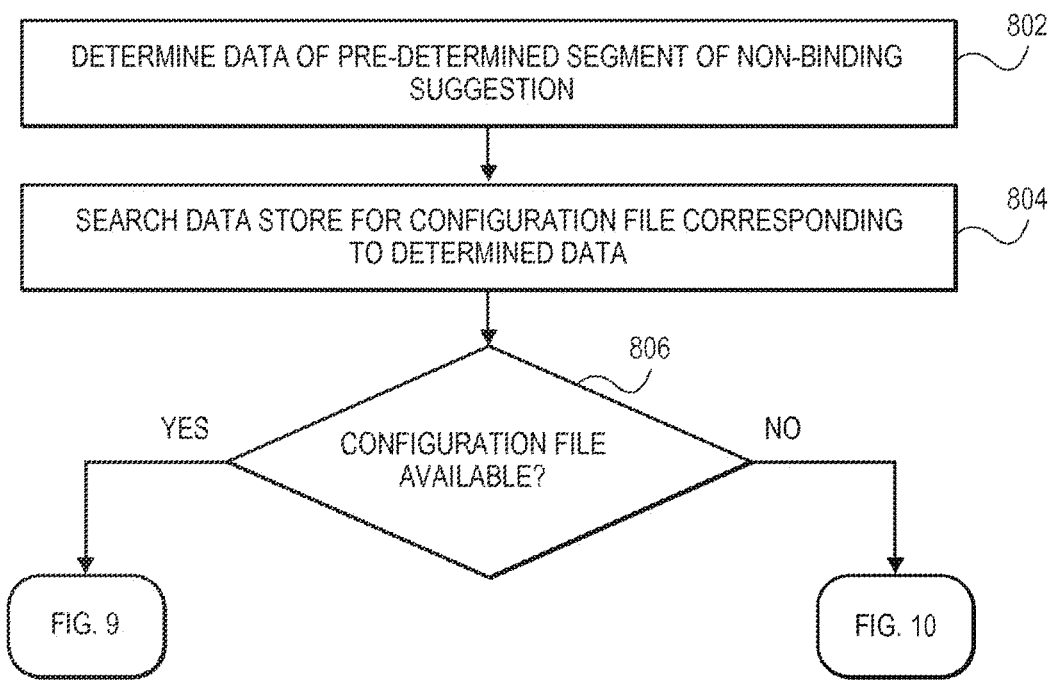
Figure 9:
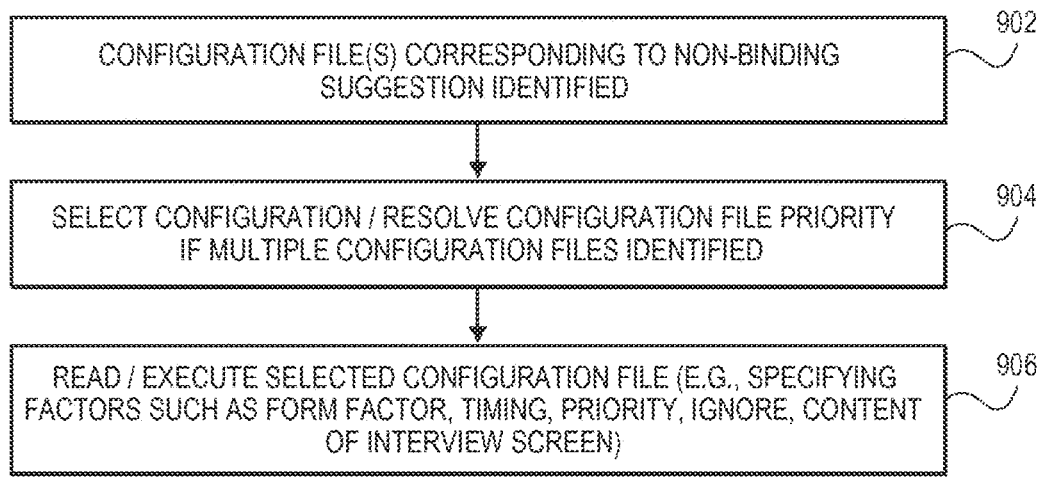
Figure 10:
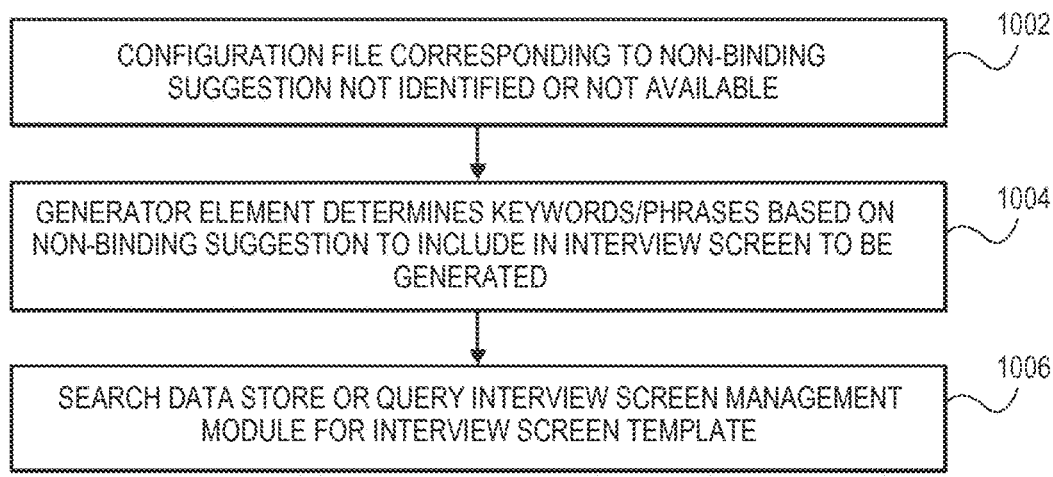
Figure 11:
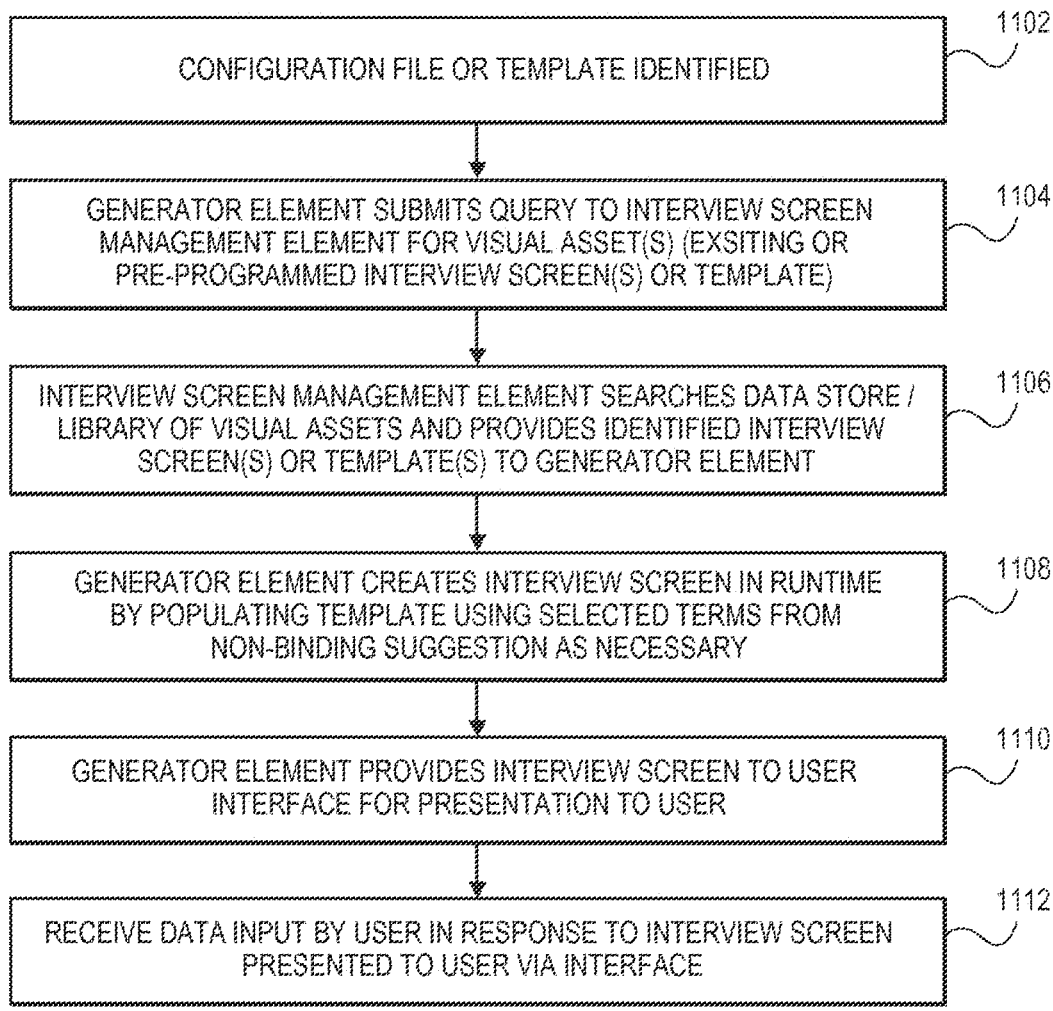
Figure 12A:
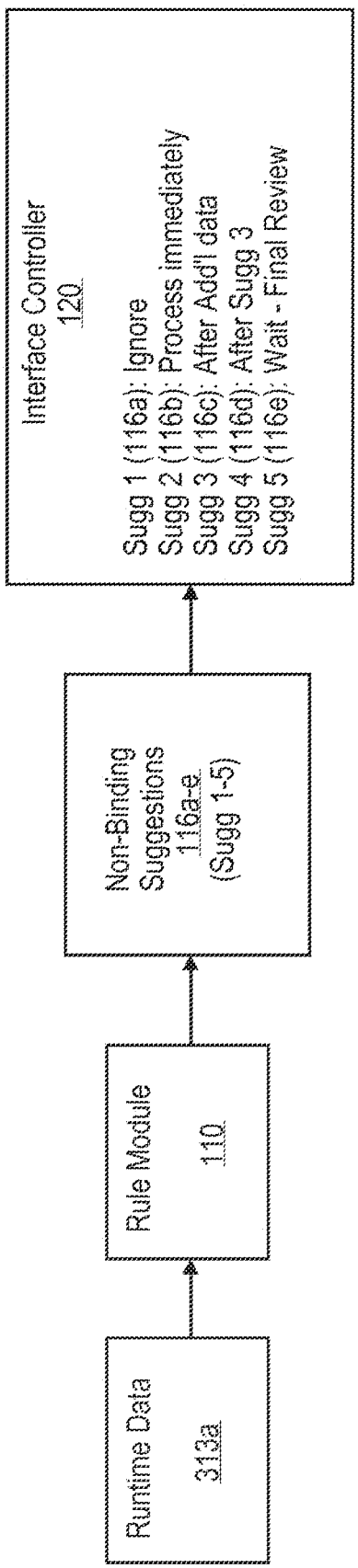
Figure 12B:
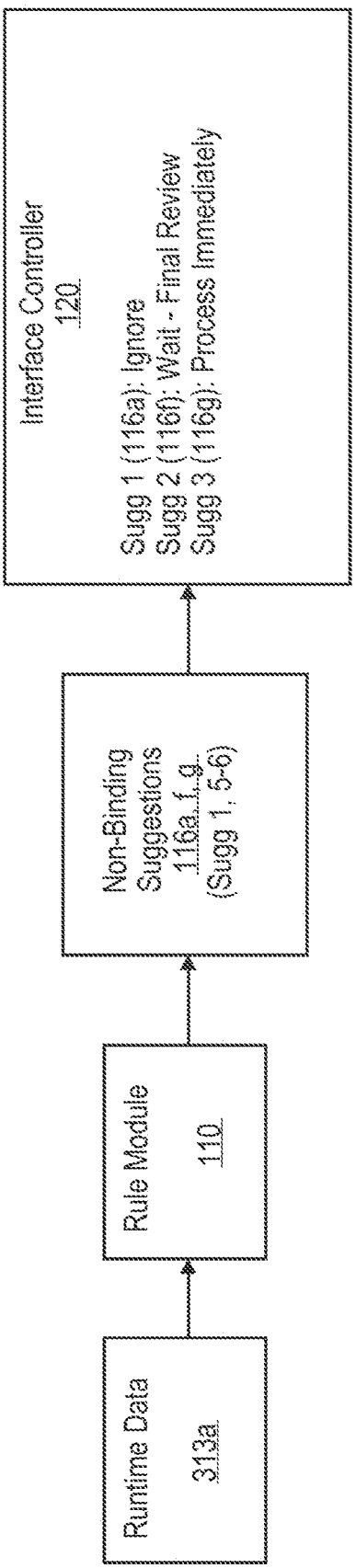
Figure 13:
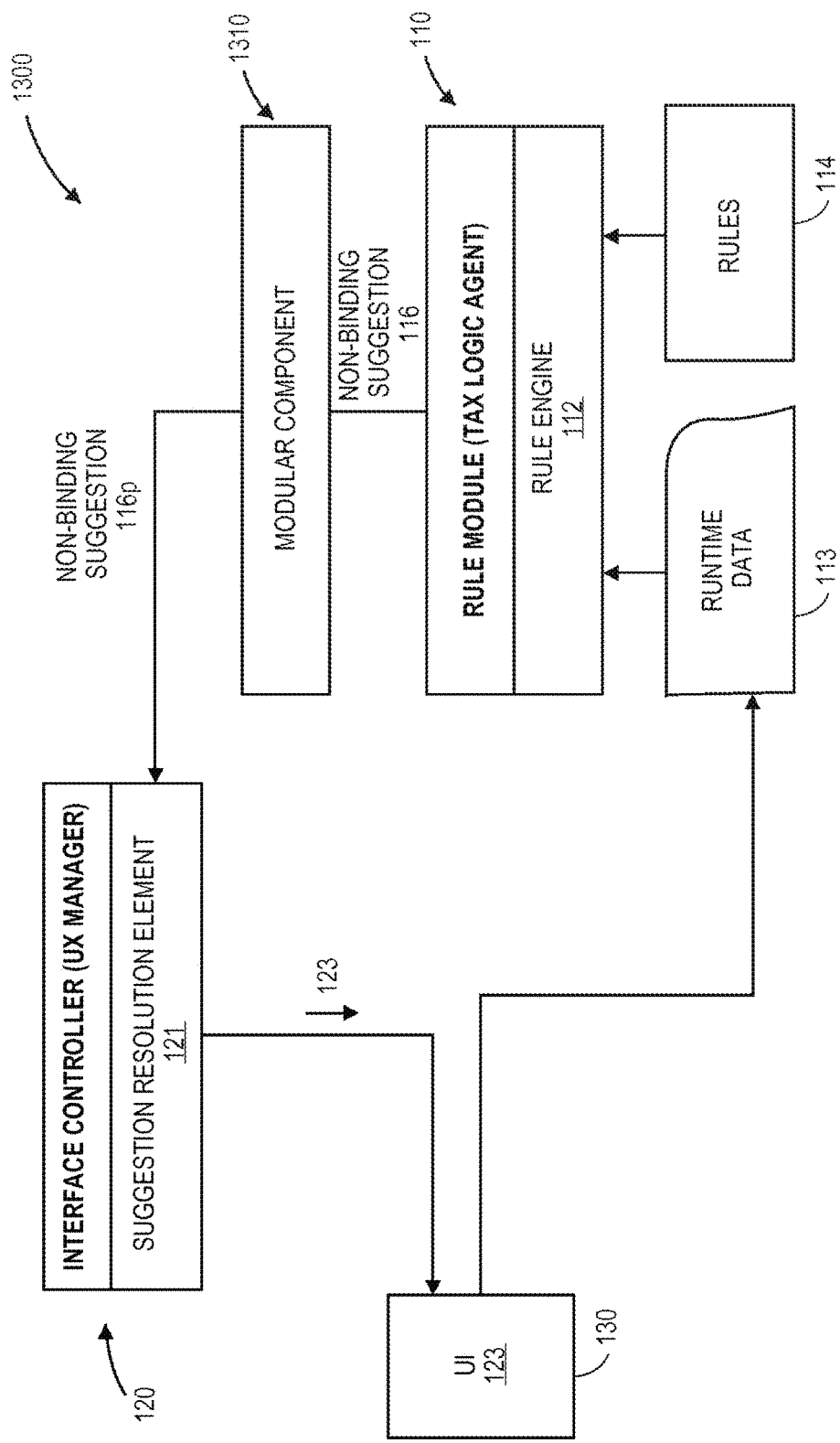
Figure 14:
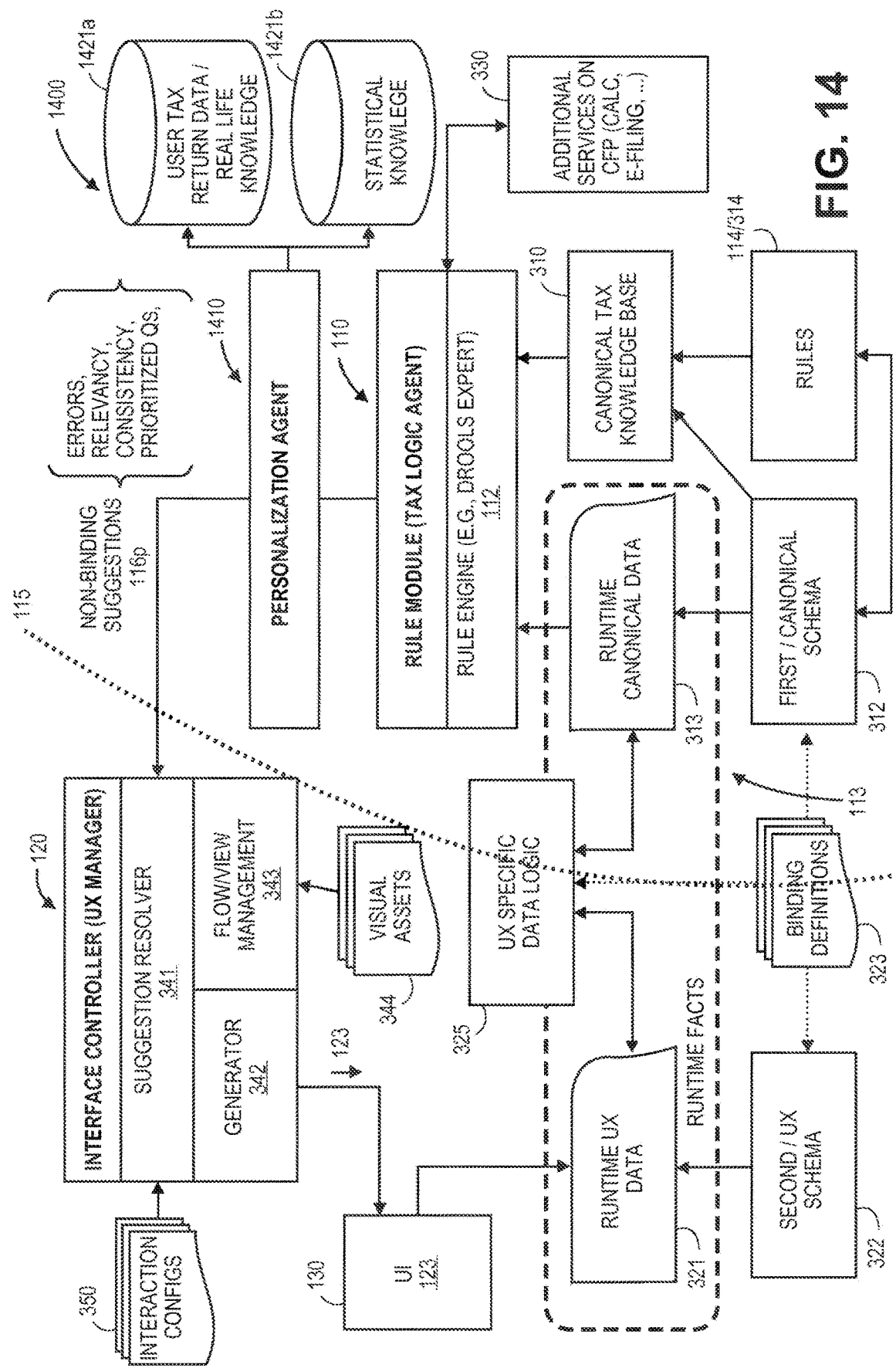
Figure 15:
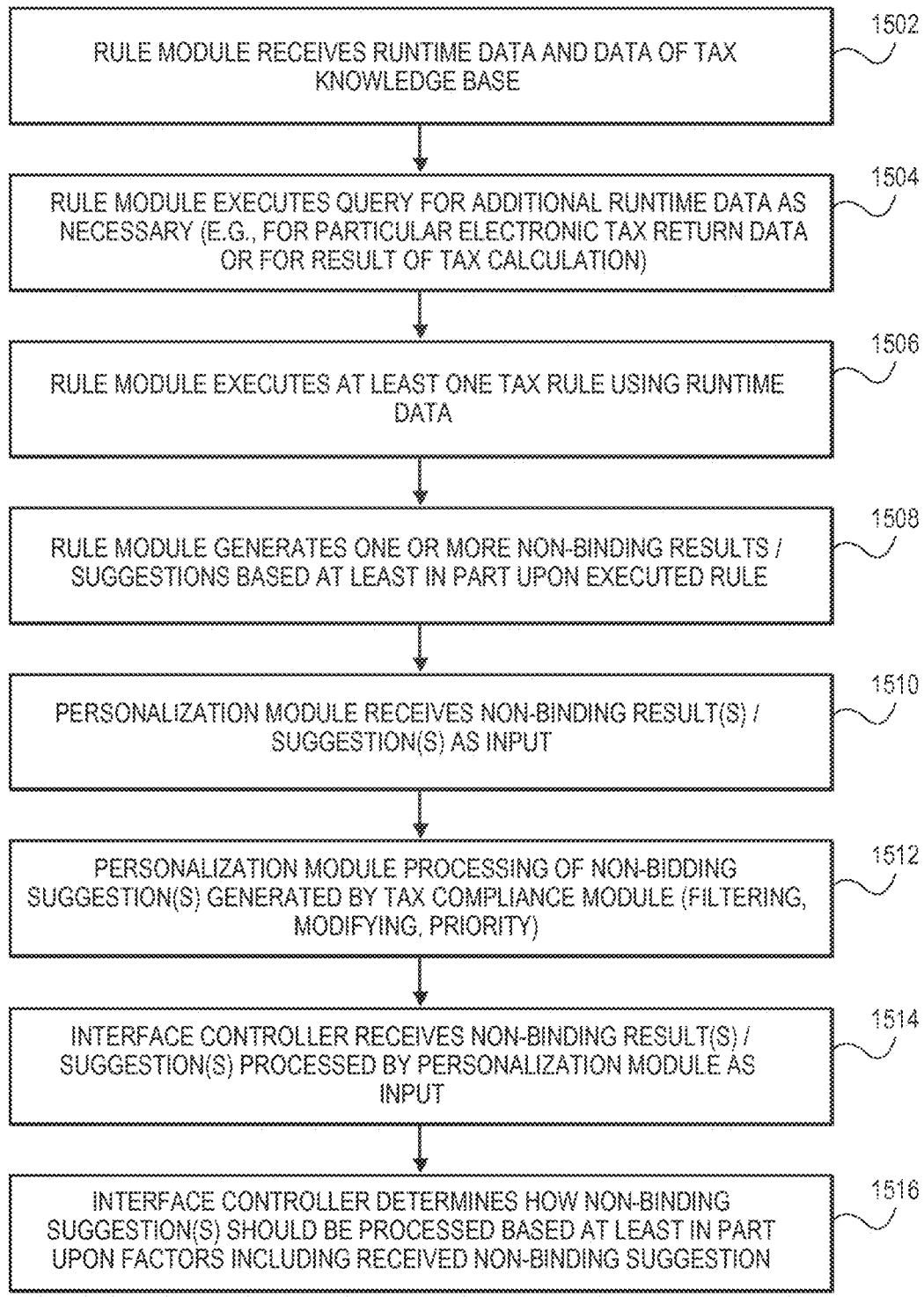
Figure 16:
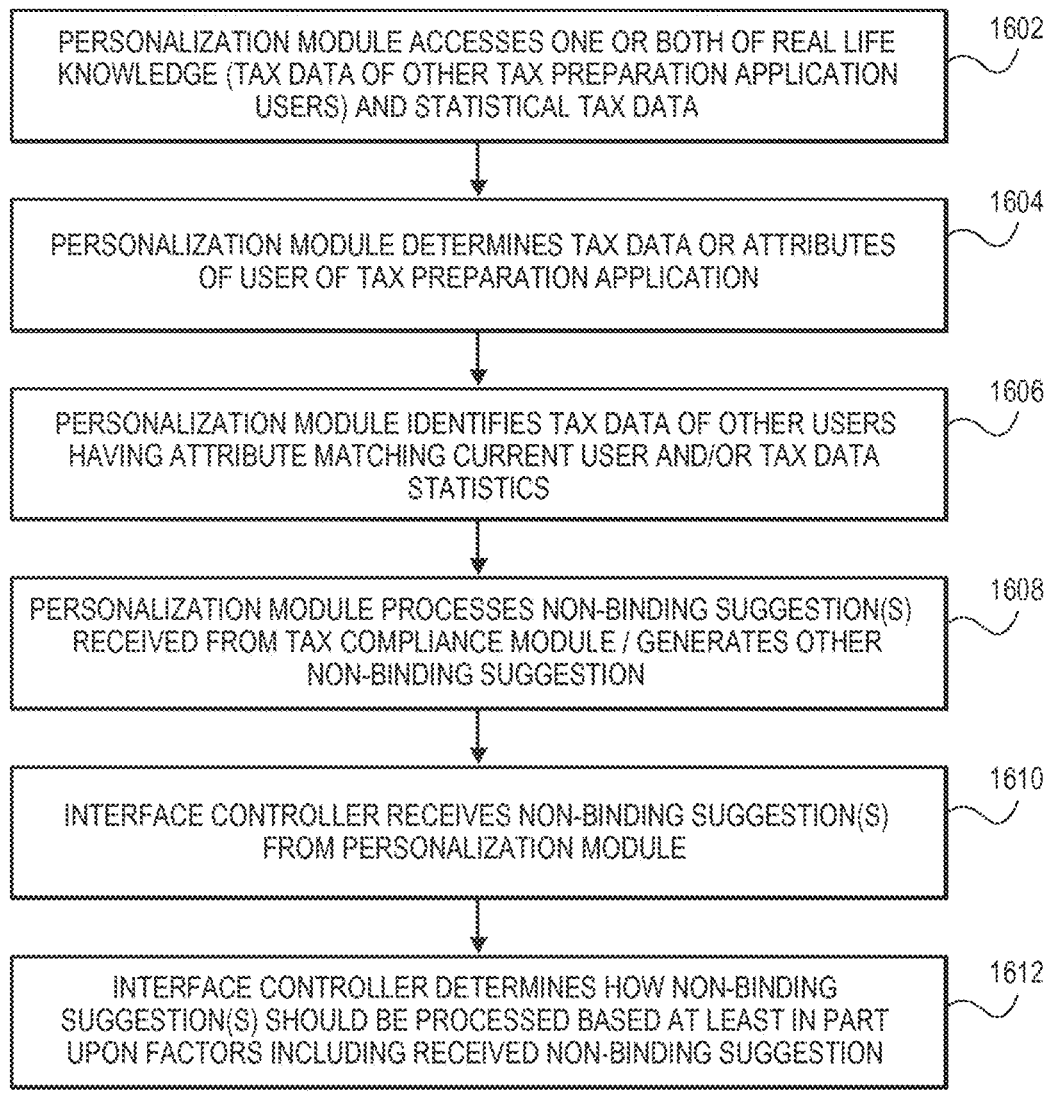
Figure 17:
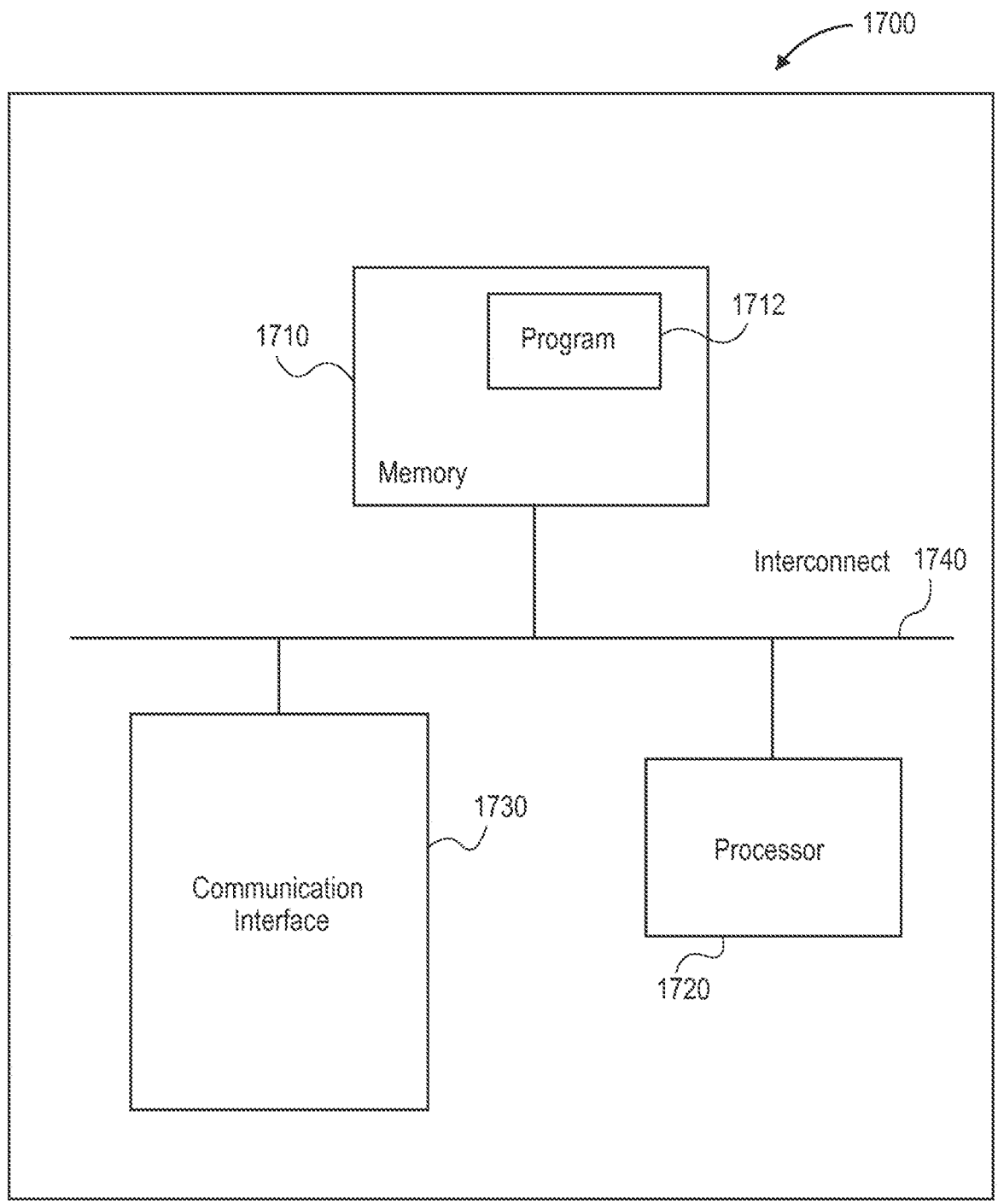
Figure 18:
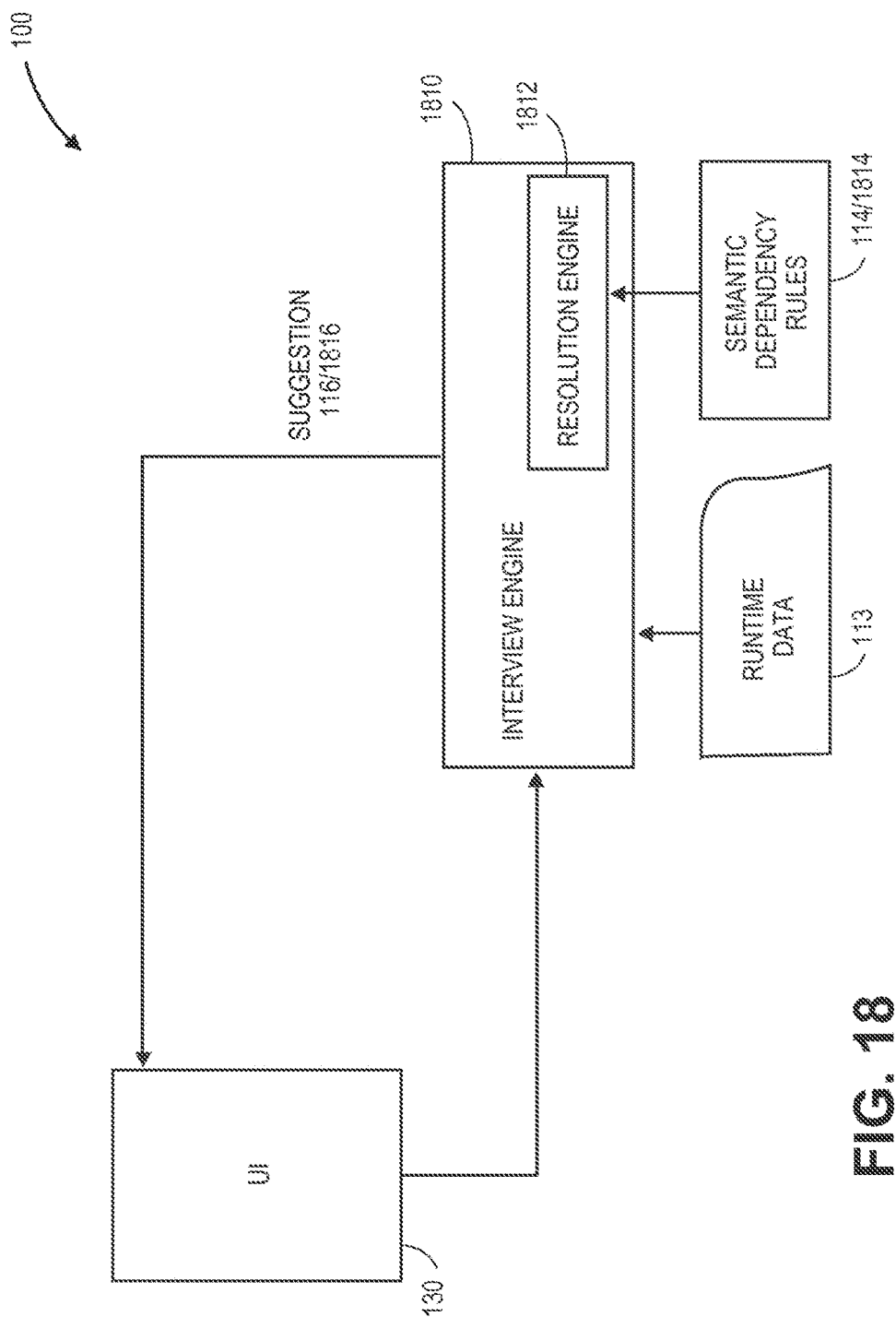

FIGS. 6A-B generally illustrate how tax preparation applications may organize presentation of questions according to a programmed flow of a sequence of questions and answers, and FIGS. 6C-D illustrate how embodiments refer to semantic dependency models rather than a programmed question-and-answer flows and how semantic dependency is determined according to embodiments;

FIG. 7 is a flow diagram of one embodiment for performing semantic dependency resolution;

FIG. 8 is a flow diagram illustrating one embodiment of processing a non-binding suggestion involving determining whether a configuration file associated with the non-binding suggestion is available for execution by an interface controller;

FIG. 9 is a flow diagram illustrating one embodiment of processing a non-binding suggestion using a configuration file executed by an interface controller;

FIG. 10 is a flow diagram illustrating one embodiment of processing a non-binding suggestion in the event that a configuration file is not available by utilizing an interview screen template;

FIG. 11 is a flow diagraph illustrating one embodiment of how an interview screen template is utilized to create an interview screen that is presented to a user of the tax preparation application;

FIGS. 12A-B generally illustrate how the number and/or type of non-binding suggestions generated according to embodiments can change with new or updated runtime data, and further illustrates different ways an interface controller can process non-binding suggestions;

FIG. 13 is a block diagram of a suggestion-based interview engine system of a tax preparation application constructed according to one embodiment and further illustrating modularity of system embodiments and being able to add one or more components that work with an rule module and interface controller;

FIG. 14 is a block diagram of a suggestion-based interview engine system of a tax preparation application constructed according to one embodiment and further illustrating modularity of system embodiments by incorporation of a personalization module that can process, modify or filter suggestions generated by a rule module;

FIG. 15 is a flow diagram illustrating how a personalization module illustrated in FIG. 14 can be utilized according to one embodiment;

FIG. 16 is a flow diagram illustrating how a personalization module executes and processes non-binding suggestions according to one embodiment;

FIG. 17 is a block diagram of components of a computing apparatus or system in which various embodiments may be implemented or that may be utilized to execute various embodiments; and FIG. 18 is a block diagram of components of a system constructed according to another embodiment for performing semantic dependency resolution.

DETAILED DESCRIPTION OF ILLUSTRATED EMBODIMENTS

Embodiments are directed to methods, systems and articles of manufacture or computer program products for determining what to ask or present to a user of a tax preparation application such as TURBOTAX tax preparation application available from Intuit Inc., Mountain View, Calif. TURBOTAX is a registered trademark of Intuit Inc.

In contrast to known tax preparation applications, embodiments involve a modular interview engine that employs a rule module and interface controller module that are loosely coupled to each other such that the rule module is dedicated to executing tax or tax return related rules to generate results in the form of non-binding suggestions or recommendations for the interface controller. Rules executed by the rule module may include rules that express tax or tax return requirements, rules specifying comparisons or analysis of data or fields of an electronic tax return to identify errors, inconsistencies, fields or forms for potential completion or potential topics. Rules may also involve semantic dependency of possible interview questions and the rule module determining, based on the received runtime data, which questions are independent or free of dependency upon an answer to another question, and which questions are not.

Non-binding suggestions or recommendations may be a keyword, hint, phrase or description of what to possibly present to the user and are provided as inputs to the interface controller. For example, the suggestion may concern tax return or tax authority requirements, tax forms or fields to be populated, potential topics and related forms or sequences or forms, potential errors or inconsistencies in the electronic tax return, and questions that are determined to be independent or free of semantic dependency such that they do not depend upon an answer to another related question.

A non-binding suggestion may be pushed or selectively pushed by the rule module to the interface controller, pulled or selectively pulled by query by the interface controller from the rule module, or pushed by the rule module to a shared memory such that the interface controller can query the shared memory for non-binding suggestions.

The interface controller determines whether, when and/or how the non-binding suggestions should be processed and incorporated into an interview screen presented to the user. The interface controller may decide process the suggestions right away or on the spot such that a message is displayed in a current interview screen or in the next interview screen addressing the suggestion. Or, the interface controller may decide to process the suggestion at a later time, such as after other data has been entered into the electronic tax return. These actions and determinations are made during runtime as opposed to being pre-determined according to a programmed tree structure, and suggestions generated by the rule module and the decisions made by the interface controller may be dynamic and change during runtime as runtime data is received or imported into the electronic tax return and iterations of determinations are performed based on the new or incoming data.

Thus, while the rule module and interface controller work together, the suggestions generated by the tax compliance module are non-binding in that the interface controller determines how they should be processed, if at all, thus providing a more flexible interview engine and method using modules that retain a degree of independence or autonomy.

Figure 1:
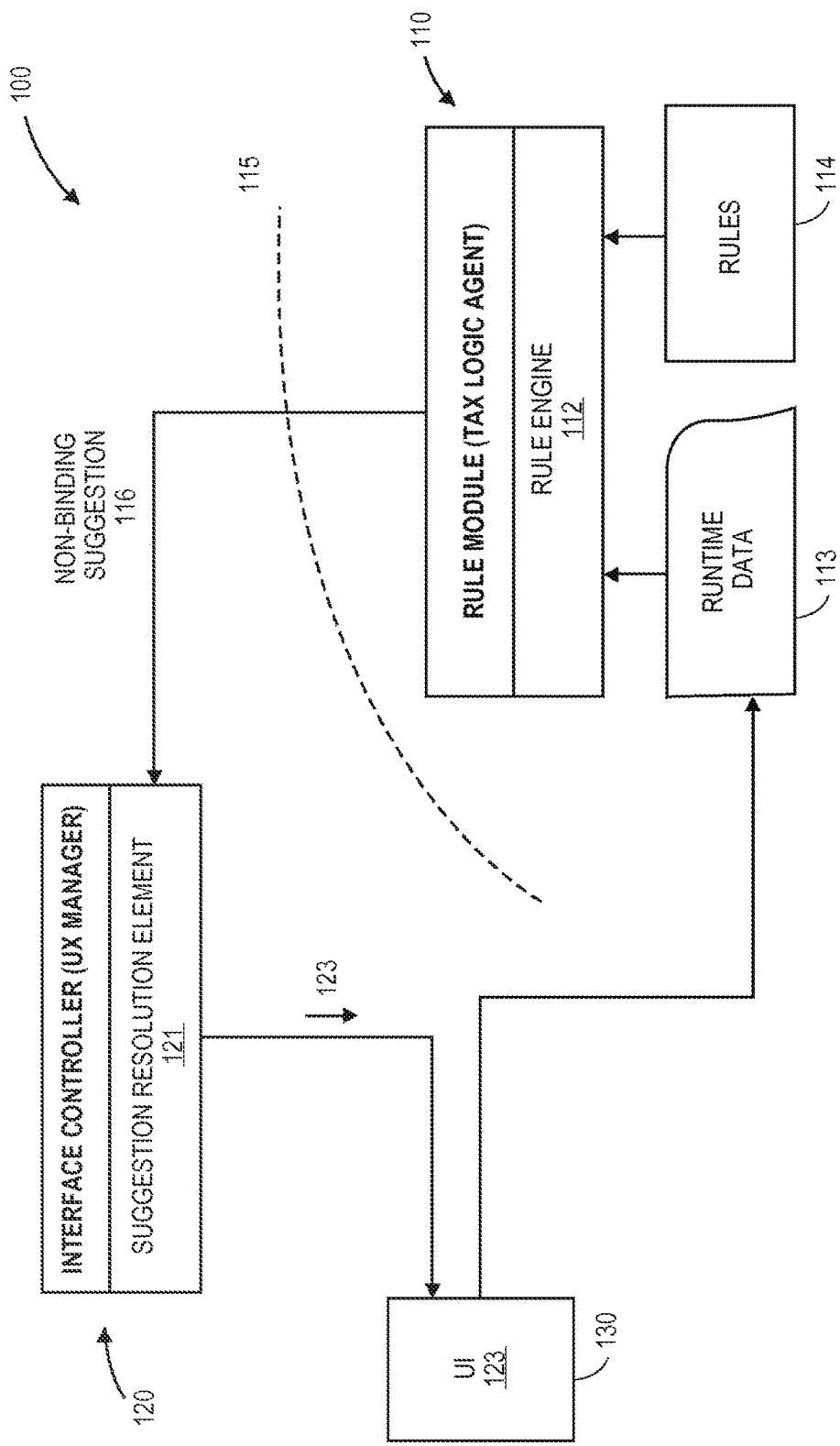
FIG. 1 is a block diagram of a suggestion-based interview engine system of a tax preparation application constructed according to one embodiment.

For example, referring to FIG. 1, a computerized system 100 constructed according to one embodiment comprises or involves a rule module 110, otherwise referred to as a tax logic agent (TLA) or tax compliance module 110 as shown in FIG. 1. The rule module 110 includes or executes a rule engine 112. The system 100 also includes an interface controller 120, otherwise referred to as a user experience (UX) manager 120 in FIG. 1. The rule module 110 and the interface controller 120 are in communication with each other and may be embodied within an article of manufacture comprising a desktop version of a tax return preparation application, on the same computer or server hosting an on-line version of the tax preparation application, or on different computers utilized to implement the on-line tax return preparation application.

The rule module 110 and the interface controller 120 are loosely coupled to each other in that they are separately definable elements or modules that are in communication with each other, but the interface controller 120 may consider, but is not controlled by, the suggestion 116 or output generated by the tax compliance module 110. This is generally represented by the dashed line 115 in FIG. 1 between the rule module 110 and the interface controller 120.

The interface controller 120 comprises or executes a suggestion resolution element or suggestion resolver 122 to determine whether, when and/or how to process the suggestion 116 generated by the rule module 110. The interface control 120 generates an interview screen or content thereof 123 incorporating the suggestion 116 that is presented to the user via user interface (UI) 130.

Figure 2:
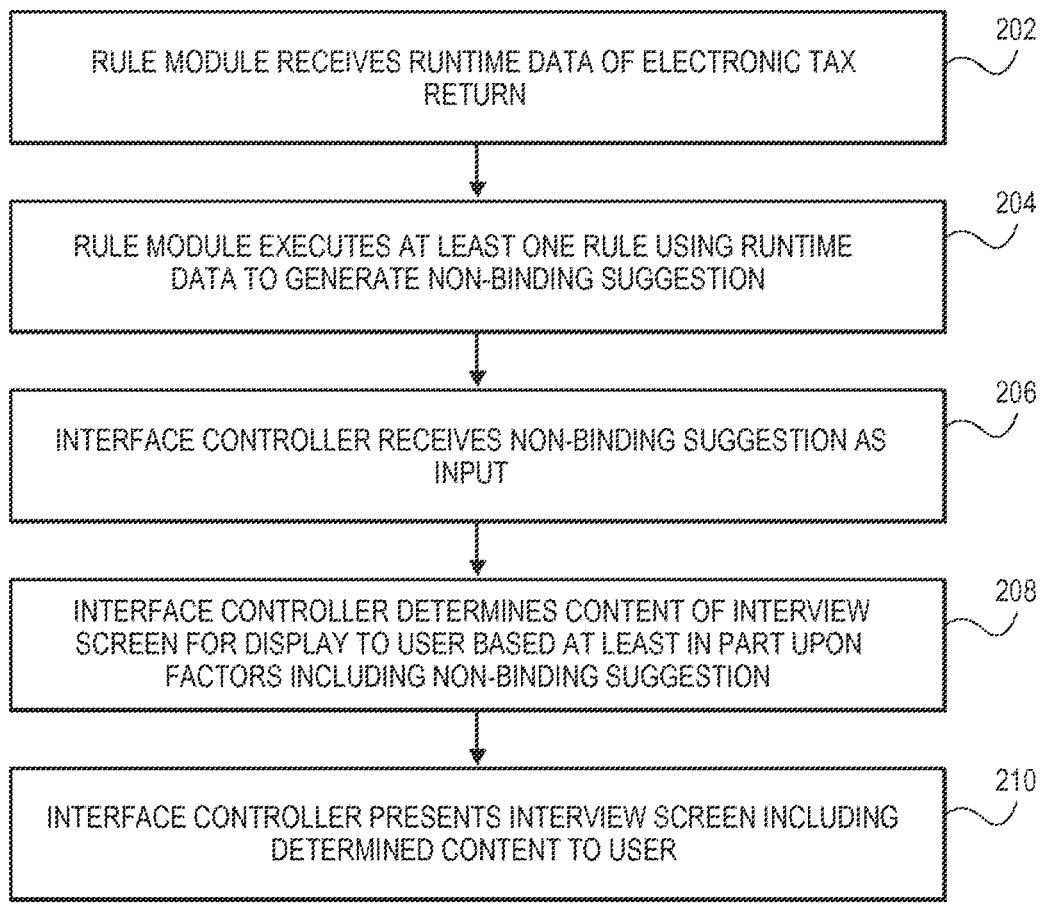
FIG. 2 is a flow diagram of one embodiment for determining what to present to a user of a tax preparation application using a suggestion-based interview engine according to embodiments.

Referring to FIG. 2, and with continuing reference to FIG. 1, in a computer-implemented method according to one embodiment, at 202, the rule module 110 receives runtime data 113. Runtime data 113 may be received the user (which interacts with the UI 130) or an electronic source from which runtime data is electronically imported into the electronic tax return. The rule module 110 also receives a plurality of rules 114. Embodiments may involve rules 114 of one or multiple types. For example, rules 114 may specify requirements of a tax authority such as the Internal Revenue Service (IRS) or other tax authority or tax collecting entity. Two examples of tax-related rules 114 are generally expressed as follows:

// comments: "W2 Wages Greater Than Min(10,000) and Withholding Missing"
when
    $irsW2: IRSW2(wagesAmt>1000, withholdingAmt==0)
then
    Suggestion msg=new Suggestion("W2", "W2 Wages Greater Than Min(10,000) and Withholding Missing", $irsW2);
end
// comments: "W2 Withholding Greater Than Max Rate of Wages"
when
    $irsW2: IRSW2(withholdingAmt>wagesAmt*0.4)
then
    Suggestion msg=new Suggestion("W2", "W2 Withholding Greater Than Max Rate of Wages", $irsW2);
end Rules 114 may also pertain to error checking or consistency of data within the electronic tax return or within the electronic tax return compared to recently received runtime data. For example, a rule may involve comparing data entered in different fields, whether data is entered in different fields. Rules 114 may also concern semantic dependency for identifying questions that are independent of an answer or response to another question such that these independent questions can be selected as candidates for presentation to the user. For ease of explanation, reference is made to rules 114 generally, but it will be understood that the rules 114 may be used for different purposes including those mentioned above, and that different numbers and/or types of rules 114 may be executed by the rule engine 112.

Continuing with reference to FIG. 2, at 204, the rule module 110 executes at least one rule 114 using the runtime data 113 to generate one or more results in the form of non-binding suggestions 116. According to embodiments, the non-binding suggestion 116 serves as a recommendation or "hint" of possible questions or content that the interface controller 120 can use for presentation to the user via the UI 130. The non-binding suggestion 116 generated or output by the rule module 110 is provided as an input to the interface controller 120 at 206, and at 208, the interface controller 120 determines an interview screen or content thereof 123 to present to the user via the UI 130 based on factors including the received non-binding suggestion 116. In response, the user enters or provides other or additional runtime data 113 into fields in response to the presented interview screen or content 123 via the UI 130. Method steps described above with reference to FIGS. 1-2 are repeated using the new, supplemental or other runtime data 113 and execution of at least one rule 114 using the new, supplemental, or other runtime data 113 and resulting non-binding suggestions 116.

Thus, embodiments provide a dynamic, adaptive interview engine that makes runtime determinations for generating runtime non-binding suggestions 116 for use by the interface controller 120. For example, it may be that given a first set of runtime data 113, the rule module 110 generates a first set of non-binding suggestions 116, and as the user responds to the presented interview screen or content 123 thereby resulting in additional or new runtime data 113. This additional or new runtime data 113 is received or determined (e.g., based on a tax calculation or as the user enters data into fields of presented interview screens), and this leads to execution of the same or other rules 114 and a resulting different, second set of non-binding suggestions 116, and so on, as additional runtime data 113 is generated, received or determined. Further embodiments and aspects of embodiments are described in further detail with reference to FIGS. 3-18.

Figure 3:
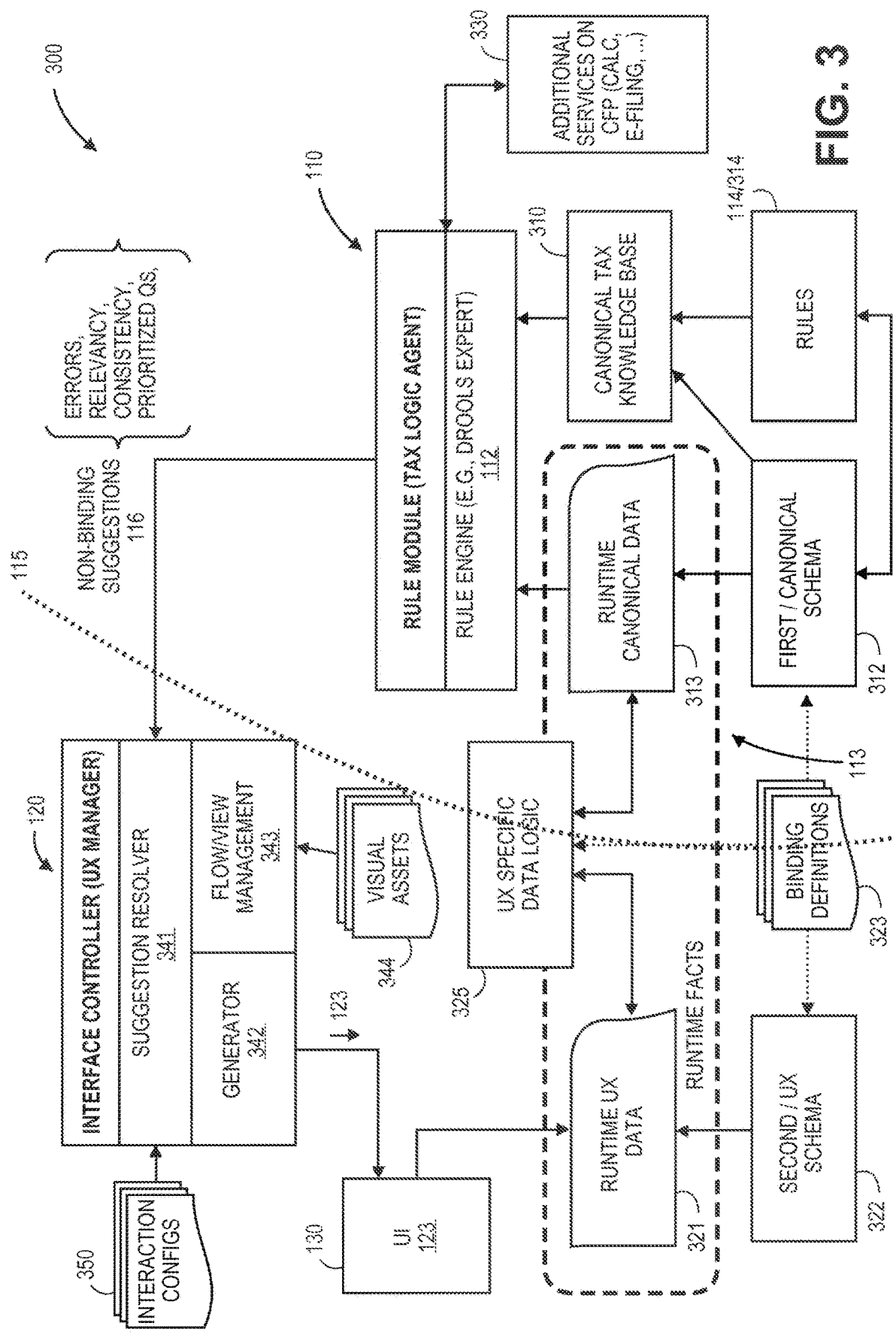
FIG. 3 is a block diagram of a suggestion-based interview engine system of a tax preparation application constructed according to one embodiment including a rule module and an interface controller.

Referring to FIG. 3, a system 300 constructed according to one embodiment includes the rule module 110 that comprises or executes a rule engine 112 based on runtime data 113, an interface controller 120 and the UI 130 with which the user interacts. In the illustrated embodiment, the rule module 110 receives data of a canonical tax knowledge base 310 that includes or is based on terms of a canonical tax schema or model 312 (generally, first schema or canonical schema), or terms structured in a first format and associated rules 314. A canonical schema 312 defines tax-related concepts or terms, e.g., by names, type or category and hierarchy. Concepts or terms may include, for example, "name," "social security number," "citizenship," "address," "employer," "interest," "dividends," "mortgage," "deduction," "tax credit," "capital gain," etc. It will be understood that there may be hundreds or thousands of such concepts or terms. The canonical schema 312 may be defined in various ways, and one example is based on an Extensible Markup Language (XML) schema.

As further illustrated in FIG. 3, runtime data 113 may include runtime user experience (UX) data 321, or data that specific to the type or version of the tax preparation application utilized by the user. Runtime UX data 321 may be mapped, converted or transformed from a second format or model into a format or model according to the first or canonical schema 312. For example, the user may be utilizing a tax preparation application referred to as SNAPTAX tax preparation application available from Intuit Inc. that allows the user to take a photograph of a tax document using a mobile communication device or other computing device including a camera for image acquisition. In this example, runtime UX data 321 is the acquired photograph, which is in a second format or schema 322 ("UX Data Schema" in FIG. 3). Data of the second format or UX data schema 322 is converted or transformed into the first or canonical schema 312 via binding definitions 323, which translate data of the photograph or second schema 321 into the canonical schema 312 by conversion logic 325 ("UX Specific Data Logic" in FIG. 3). In this manner, the rule module 110 receives runtime data 313 of the first schema 312, e.g., as reflected in pseudocode below involving SNAPTAX tax preparation application and processing a result in OCRResult and how data or a box or field within an OCR result translates to a different schema:

UX Specific Data Logic (325)
Convert UI specific data entity to the tax model field. For example, assuming OCR result of SnapTax is saved in OCRResult:
IRSW2Object=IRSW2.new
IRSW2Object.WageAmt=OCRResult.w2.box1
IRSW2Object.Employee.FirstName=OCRResult.w2.box6

Rules 314 are expressed in a declarative manner, and certain rules 314 set forth constraints, conditions or requirements of the tax authority using the concepts or terms of the first or canonical schema 312. For example, such "tax" rules 314 may specify which types of data or tax documents are required, or which fields or forms should be completed. One example is if a taxpayer is married, then the electronic tax return is required to include information about a spouse. As another example, a tax rule 314 may involve if a certain box on a form (e.g., Box 1 of Form W2) is greater than a pre-determined amount, then certain fields of the electronic tax return (e.g., withholding fields) cannot be left empty and must be completed. Thus, tax rules 314 may reflect various tax requirements and are expressed using the concepts or terms of the first or canonical schema 312.

Other rules 314 may also specify tax consequences or calculations and for this purpose, the rule module 110 may be in communication with other modules or services 330 (generally, "Additional Services" such as calculation, e-filing). The additional modules or services 330 may, for example, perform calculations or other services as runtime data 313 that is received or in response to the rule module 110, or the rule module may access or request runtime data 313 resulting from a calculation if such data is not already known by the rule module 110.

Other rules 314 may also be used for the purpose of identifying or narrowing which questions are identified as potential questions to be presented to the user. This may involve utilizing or generating rules 314 and one or more associated data structures such as a decision table or directed graph and generated decision and meta rules, which may be used for invalidation of potential questions or topics and input or runtime data requirements. For example, U.S. application Ser. No. 14/097,057, filed Dec. 4, 2013, entitled Methods Systems and Computer Program Products for Applying Generated Rules for Personalized Interview Experience," the contents of which are expressly incorporated herein by reference as though set forth herein in full, describes rules generated for the purpose of eliminating questions to ask a determined subset of questions rather than requiring a user to step through each question of a pre-determined sequence of questions in order to conclude that a particular tax situation or topic applies to the user.

For example, rules 314 may be structured to eliminate pre-determined sequence constraints and reach the tax topic conclusion while invalidating generated rules in order to eliminate corresponding questions, even when those questions would have otherwise been asked of the user according to the pre-determined sequence utilized in known tax return preparation applications.

As a more particular example, rules 314 may be generated and include decision and meta rules, and when no generated decision rule can be generated utilizing the runtime data 313, at least one generated meta rule is executed to invalidate one or more generated decision rules, thus eliminating possible rules 314 that can be utilized by the rule module 110, and thus eliminating possible non-binding suggestions 116 that could be generated by the rule module 110. Thus, decision rules, and corresponding possible questions that could be asked, and in turn, possible non-binding suggestions 116, are invalidated in response to input or runtime data 313 and when no decision rule can be executed to reduce the number of possible non-binding suggestions that could be generated based on a rule while still indicating whether a tax situation or topic applies to the user.

As another example, rules 314 that may also be used for the purpose of identifying or narrowing which questions to suggest be asked of the user may involve determinations of semantic dependencies and selection of questions that are free or independent of answers to other questions or whose dependency requirements have been satisfied.

The results of execution of these rules 314, whether rules for tax compliance or tax authority requirements, rules for errors, inconsistency or relevancy, or rules for question selection or identification, may be the basis for one or more non-binding suggestions 116. It will be understood that various types and numbers of rules 314 may be utilized for different purposes, and certain rules 314 may expressed using concepts or terms of the first or canonical schema 312, which together form the canonical tax knowledge base 310 as generally illustrated in FIG. 3, and runtime canonical data 313 comprises certain concepts or terms of the canonical tax schema 312, which is an instantiated representation of the canonical schema 312 at runtime. For ease of explanation, reference is made to rules 314 executed by the rule engine 112 of the tax compliance module 110 using runtime data 113.

According to one embodiment, the rule engine 112 or production rule system ("rule engine" as generally illustrated in FIG. 3) is a declarative, inference based or reasoning based rule engine. For example, embodiments may utilize a rule engine 112 in the form of a drools expert engine. Other declarative rule engines 112 may also be utilized, and a drools expert rule engine is provided as one example of how embodiments may be implemented.

The following pseudocode generally expresses how the rule module 110 functions utilizing a fact cache based on the runtime canonical data 313 or the instantiated representation of the canonical tax schema 312 at runtime and generating non-binding suggestions 116 provided as an input to the interface controller 120. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules 314.

Rule module/Tax Logic Agent (TLA) (110)
    // initialization process
    Load_Tax_Knowledge_Base;
Create_Fact_Cache; While (new_data_from_application)
    Insert_data_into_fact_cache;
    collection=Execute_Tax_Rules; // collection is all the fired rules and corresponding conditions
    suggestions=Generate_suggestions (collection);
    send_to_application(suggestions);
End With continuing reference to FIG. 3, the illustrated system 300 shows one embodiment of the interface controller 120 including a plurality of components or elements: a suggestion resolution element 341 ("Suggestion Resolver" in FIG. 3), a generator element 342 ("Generator" in FIG. 3) and an interview screen management element 343 ("Flow/View Management" in FIG. 3) The suggestion resolution element 341 is responsible for resolving the strategy of how to respond to incoming non-binding suggestions 116. For this purpose, the suggestion resolution element 341 may be programmed or configured internally, or as illustrated in FIG. 3, may access or external interaction configuration files 350 ("Interaction Configs" in FIG. 3).

Configuration files 350 specify whether, when and/or how non-binding suggestions 116 are processed. For example, a configuration file 350 may specify a particular priority or sequence of processing non-binding suggestions 116 such as now or immediate, in the current interview screen 123, in the next interview screen 123, in a subsequent interview screen 123, in a random sequence (e.g., as determined by a random number or sequence generator), or that the interface controller 120 should wait for additional data and/or until a final review stage initiated by the user. As another example, this may involve classifying non-binding suggestions as being ignored. A configuration file may also specify content (e.g., text) of the interview screen 123 that is to be generated based at least in part upon a non-binding suggestion 116.

The generator element 342 is in communication the suggestion element 341 and generates the resulting user interaction or experience or creates or prepares an interview screen 123 or content thereof based on the output of the suggestion element 341 and input received from the interview screen management element 343. For this purpose, the generator element 342 may communicate with the interview screen management element 343, which manages a library of visual assets 344. Visual assets 344 may be pre-programmed interview screens 123 that can be selected by the interview screen management element 343 and provided to the generator element 342 for providing the resulting interview screen or content 123 or sequence of interview screens 123 to the UI 130 for presentation to the user. Visual assets 344 may also include interview screen templates, which are blank or partially completed interview screens that can be utilized by the generation element 342 to construct an interview screen 123 on the fly during runtime in the event that an appropriate pre-programmed or pre-determined interview screen or other visual asset 344 is not available or cannot be identified by the interview screen management element 343. The following exemplary pseudocode describes system components and data described above:

Suggestion Resolution Element (341)
// Take a suggestion and consult the behavior configuration to
// decide which ones the UI will handle
Suggestions=Get_suggestions_from_TLA;
New_list=Rank_and_Filter(Suggestions, Configuration_File);
Generation Element (342)
For each item in New_list
UI_asset=Flow_View_Manager(item);
If UI_asset==NULL // if Flow_View_Manager does not have any ready to go asset for the item
 Template=Get_Template(item) // identify a template based on the item e.g. its type
 UI_asset=Construct_UI_Asset(Template, item)
 End
 End
Interview Screen Management Element (343)
Provide Look-Up Capability to Return UI Asset (Flow/View) if there is any, for Given Model Field Having described aspects of components of the embodiment of the systems 100, 300 shown in FIGS. 1 and 3, further aspects thereof and further embodiments are described in further detail with reference to FIGS. 4-18.

Figure 4:
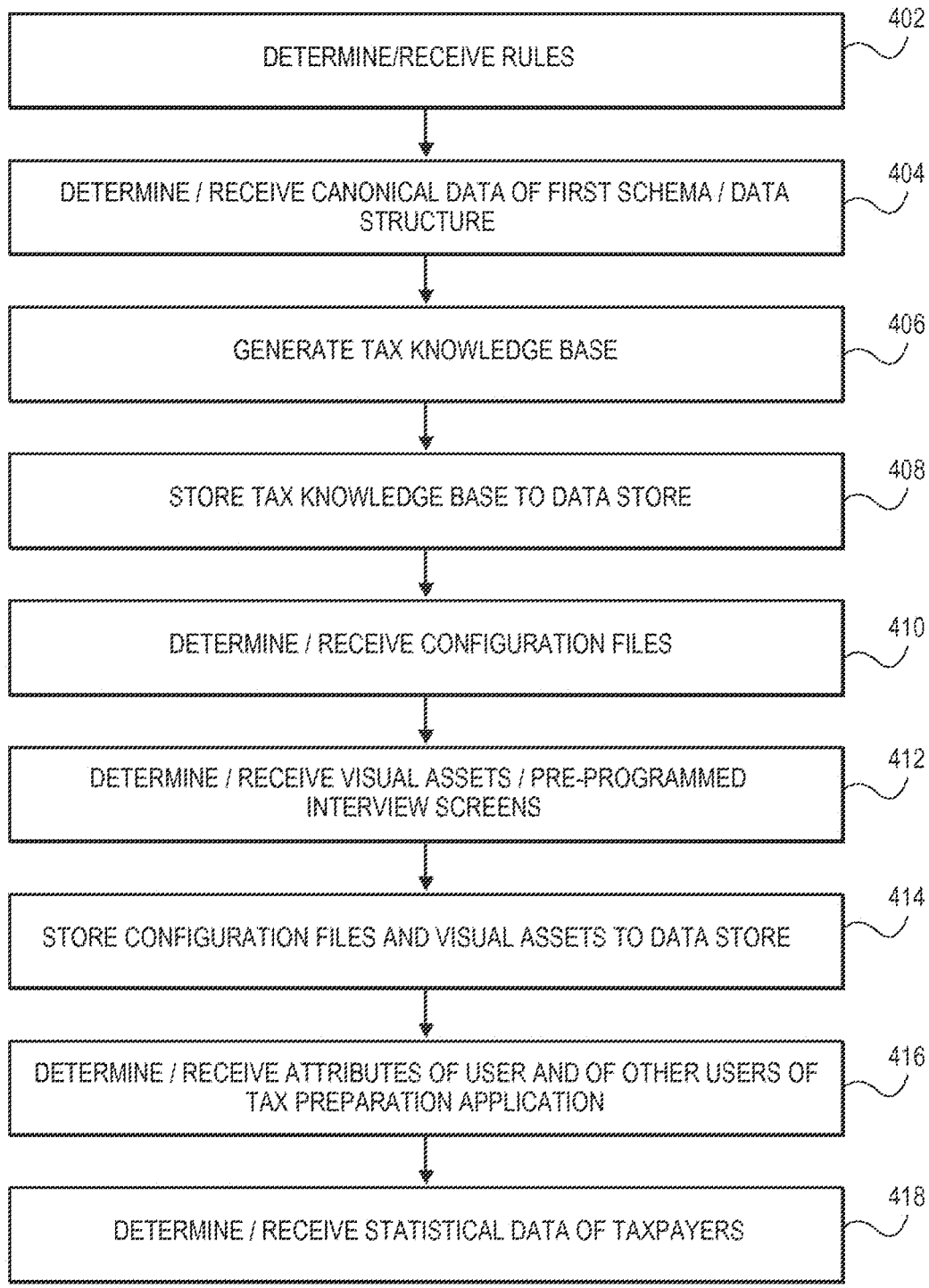
FIG. 4 is a flow diagram illustrating types of design time data generated, determined or received for use in a suggestion-based interview engine constructed according to embodiments.

Referring to FIG. 4, and with continuing reference to FIG. 3, design data is determined or generated, and this may involve, at 402, rules 314 such as tax, error or inconsistency and/or semantic dependency rules as described above being received, determined or generated. At 404, concepts or terms of the first or canonical schema 312 as described above are received, determined or generated. At 406, the canonical knowledge base 310 incorporating the concepts and terms of the canonical schema 312 and associated rules 314 is determined or generated.

According to one embodiment, rules 314 are pre-defined or determined and programmed by a host of the system 100, 300. Concepts or terms of the canonical schema 312 may also be defined by the host of the system 100, 300, or based on concepts or terms utilized by one or more tax authorities. At 408, data of the tax knowledge base 310 is stored to a database or data store. At 410, in embodiments involving configuration files 350, the configuration files 350 are determined. Configuration files 350 may be programmed or generated or received from an external source. According to one embodiment, configuration files 350 are programmed or generated by the host of the system 100, 300. A configuration file 350 may specify one or more aspects of how a non-binding suggestion 116 should be processed.

For example, a configuration file 350 may specify one or more or all of how to process the non-binding suggestion 116 based on whether to consider or ignore the non-binding suggestion 116, when the non-binding suggestion 116 should be processed, content of an interview screen 122 based on the non-binding suggestion 116, how to present content or interview screens 122 based on the non-binding suggestion 116 in view of a form factor of a computing device utilized by the user of the tax preparation application, which non-binding suggestion(s) 116 have priority over others or a sequence of non-binding suggestions 116, which configuration files 350 have priority over others or a sequence of configuration files 350 in the event that multiple configuration files 350 may potentially be used for purposes of configuration conflict resolution. For example, a configuration file 350 may specify that a non-binding suggestion 116 should be processed or addressed immediately or on the spot, next, at a later time, after certain or other additional tax return data has been received, or at the end of the process.

Configuration files 350 may also specify whether non-binding suggestions 116 should be processed individually or aggregated for processing as a group with resolution of any priority issues. As another example, a configuration file 350 may specify that content should be adjusted or whether or how non-binding suggestions 116 should be processed in view of a screen size or dimension of a computing device that executes the tax preparation application. Additional questions or more content may be more suitable for computing devices such as laptop and desktop computers, which have larger screens than smaller mobile communication devices such as smartphones.

As yet another example, a configuration file 350 may specify how a non-binding suggestion 116 should be processed based on the most recent or current non-binding suggestion 116, or the non-binding suggestion 116 that relates to the most recent or current interview screen 123 presented to the user, processing non-binding suggestions 116 on a First In First Out (FIFO) basis (which may involve marking non-binding suggestions 116 or maintaining a status table to record when non-binding suggestions are received and/or processed). Configuration files 350 may also specify types of non-binding suggestions 116 that can be ignored, or when certain types of non-binding suggestions 116 can be ignored, or that certain types of non-binding suggestions 116 are processed at certain times or immediately or on-the-spot. Thus, it will be understood that FIG. 3, which illustrates configuration files 350, is provided to illustrate one example of how embodiments may be implemented in a non-limiting manner.

A configuration file 350 may involve one or more or all of the exemplary factors noted above. Configuration files 350 can be stored to a database or data store together with respective configuration file 350 identifiers, such as a keyword or other identifier or indicator associated with or that is a component of a non-binding suggestion 116 (e.g., within a pre-determined field or segment of the non-binding suggestion 116). Thus, when a non-binding suggestion 116 is received, a keyword or indicator of the non-binding suggestion 116 can be determined, and configuration file 350 segments can be searched for a match to identify a configuration file 350 that is associated with a non-binding suggestion 116.

With embodiments, as shown in FIG. 3, configuration files 350 are independent or separate from the interface controller 120 and thus can be added, deleted and reprogrammed independently of the interface controller 120 and independently of the rule module 110. This further demonstrates the modularity and independence of system components of embodiments. In other embodiments, a configuration file 350 the interface controller 110 embodies an internally programmed configuration.

With continuing reference to FIG. 4, at 412, the computing system receives or generates the visual assets 344 or pre-programmed interview screens 123. A visual asset 344 may be a pre-programmed interview screen or content (e.g., explanation, question, field configuration) thereof. A visual asset 344 can be selected based at least in part upon processing of the non-binding suggestion 116 or execution of a configuration file 350. Visual assets 344 can also be stored to a database or data store accessible by the interface controller 120.

With continuing reference to FIG. 3, in certain embodiments involving a personalization module 1410 (described in further detail with reference to FIGS. 13-16), at 416, the system receives or determines attributes of the current user of the tax preparation application and other users of tax preparation application and/or at 418, receives or determines statistical taxpayer data. This data may be utilized for constructing customized questions and modifying or adjusting non-binding suggestions 116 (e.g., modifying the sequence or specifying a priority of non-binding suggestions 116) in order to provide a more personalized tax return preparation experience to the current user. The following pseudocode generally defines one manner of implementation of a personalization module:

Personalization Module
    // initialization process
    // User_profile is globally accessible
    Suggestions=Get_suggestions_from_TLA,
    Questions=[ ] // create an empty collection to store generated questions
    For each x in Suggestions
        Question=Construct_Customized_Question(x, User_Profile)
        Questions<<Question
    End
    Send_Questions(Questions)

For example, statistical data may apply to taxpayers generally such as if taxpayers are older than a certain age, they are unlikely to be claimed as a dependent, or if a taxpayer has an income greater than a certain amount, then they are more likely to own a home and may qualify for mortgage interest and property tax deductions.

As another example, data may involve electronic tax return data of other users of the tax preparation application being mined to identify attributes of those other users associated with respective tax return data. For example, electronic tax return data can be mined to determine that if an occupation of a current user of a tax preparation application is "police officer" who had deductible expenses associated with purchasing and cleaning of uniforms, this "real life" statistical data that goes beyond tax compliance may be used generate or process or modify a non-binding suggestion 116 based on data that is more reflective attributes of the current user of the tax preparation application and that may serve to indicate the relative importance for various tax concepts in view of these attributes. While attributes in the form of "occupation" and "expenses" are provided as an example, it will be understood that other attributes may be utilized. Having described how system components are configured and operate, further aspects of embodiments are described with reference to FIGS. 5-18.

Figure 5:
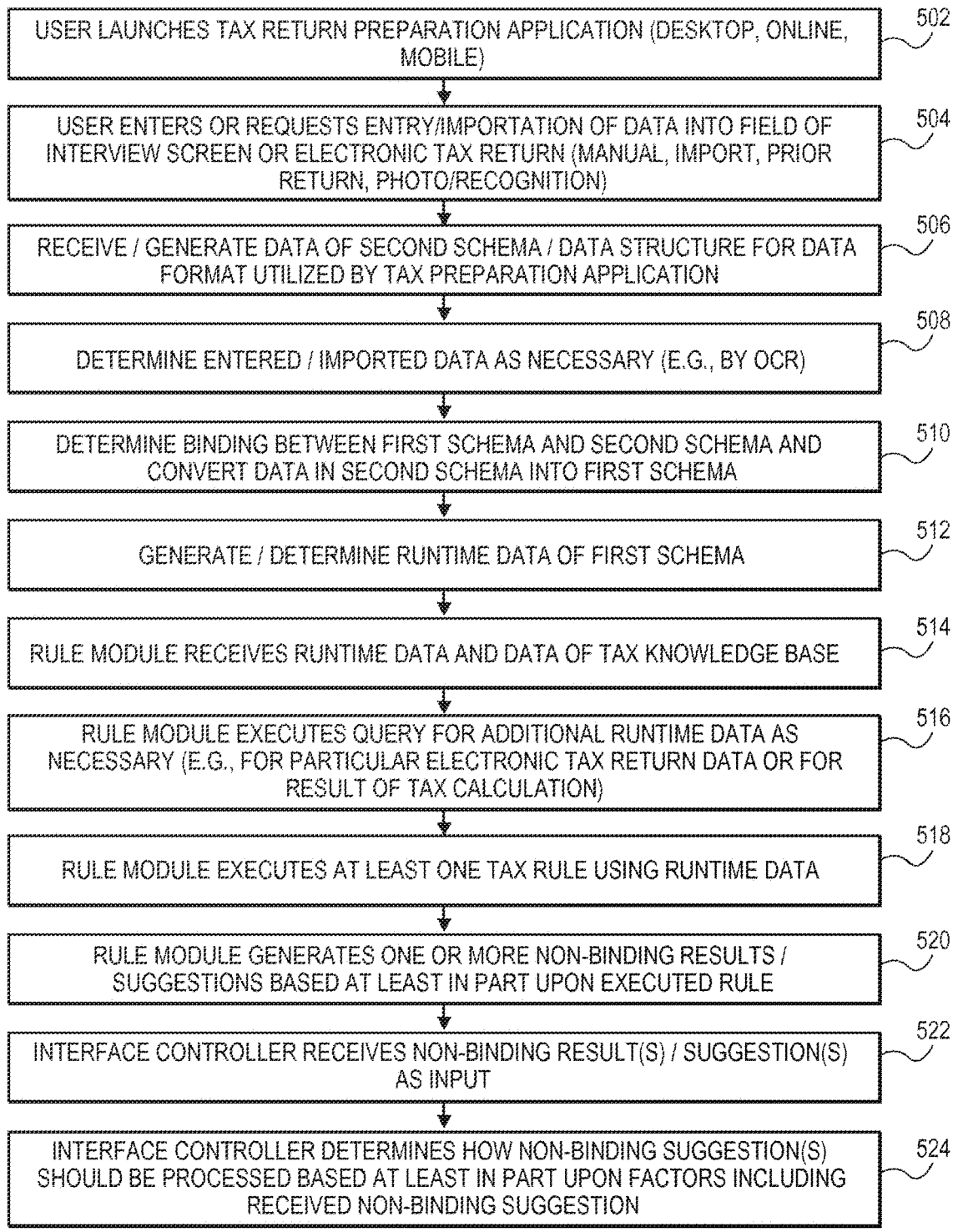
FIG. 5 is a flow diagram of one embodiment for determining what to present to a user of a tax preparation application using a suggestion-based interview engine according to embodiments and involving schema or data conversion.

Referring to FIG. 5, and with continuing reference to FIG. 3, at 502, the user launches the tax return preparation application on his or her computing device such as a desktop or laptop computer or a mobile communication device such as a tablet computing device or smartphone, and one or more interview screens are presented to the user via the UI 130. The tax preparation application may be a desktop or locally executing version or the user may execute a browser to access an online version of the tax preparation application. For ease of explanation, reference is made to tax preparation application and user computing device generally.

At 504, the user enters or requests entry/importation of data into field of interview screen or electronic tax return. Data may be entered manually, imported from an electronic source such as a priori year electronic tax return or an electronic file of a financial management system, one example of which is QUICKEN financial management system available from Intuit Inc.

Data may also be entered or acquired via other methods such as acquiring a photograph of a tax document, and in these instances in which received or acquired data is structured according to a different format, model or schema, at 506, data 321 of the other or second schema 322 is received or generated (e.g., via a recognition process such as OCR in the case of processing an image of a tax document) and at 508, the recognized or determined data is converted or transformed into a first or canonical schema 312 and entered or imported into respective fields of an interview screen or electronic tax return. While SNAPTAX tax preparation application is provided as one example of a tax preparation application that can be used to acquire images of tax documents, it will be understood that embodiments are not so limited, and that other schema conversions may be employed depending on the type of runtime UX data 321 acquired or received.

More specifically, continuing with reference to FIG. 5, at 510, in embodiments in which a second or other schema or model 322 is utilized, the binding 323 between the first or canonical tax schema 312 and the other, second schema 322 is determined and data in the second schema or model 322 is converted or transformed into data in the first schema or model 312 such that, at 512, runtime data 313 in the first schema or model 312 is generated. At 514, the rule module 110 receives runtime data 313 and data of tax knowledge base 310, and at 516, if necessary, executes a query to one or more additional services 330 for any additional runtime data, e.g., for particular electronic tax return data or for result of tax calculation involving data that has already been received.

At 518, the rule module 110 executes at least one rule 314 of the knowledge base 310 using runtime data 313, and at 520, generates one or more non-binding results/suggestions 116 based at least in part upon executed rule 114.

According to one embodiment, the non-binding suggestion 116 generated at 520 involves correction of an error in data of the electronic tax return or consistency or completeness of data that has been entered or imported. With embodiments, errors or inconsistencies can be identified or resolved during preparation of the electronic tax return before a user requests an error check by selecting an error check item from a menu, e.g., as part of a final review.

For example, a rule 114 executed by the rule module 110 may call for determining previously entered data for a certain data or field type or name, and comparing that previously entered data with currently or recently entered or received runtime data 313, and determining whether the current runtime data 313 or data received most recently matches the previously entered data. For example, the rule module 110 may have received data that was previously entered in an electronic tax return, and other runtime data 313 of the same type that does not match, such as a typographical error (e.g., "Jon" and "John") or a missing or wrong digit of a social security number that appears within multiple fields of an electronic tax return or form. Identifying errors or inconsistencies may involve, for example, the rule module 110 comparing data previously entered or imported into the electronic tax return and data most recently received or received an entered into another field or form of the electronic tax return, comparing a number of digits or letters in data previously entered or imported into the electronic tax return and data most recently received or received an entered into another field or form of the electronic tax return (e.g., if the same type of data is entered in another section of the electronic tax return), or comparison of a tax-related status indicated in one section of the electronic tax return, which may not match or contradict another tax-related status in another section of the electronic tax return when the statuses should be the same or match. An error or inconsistency may also involve the rule module 110 determining that a certain form or field of the electronic tax return has been completed, but a related or other required section has not been completed. For example, a rule 314 may specific that if data of an electronic tax return or a box indicates that a certain tax situation applies, then certain other forms or sections must be completed, or that if data was entered or a box was checked, then another part of the electronic tax return cannot have a contrary indication. For example, data of the electronic tax return may indicate that the user is married, but no spouse information has been entered.

These types of errors or inconsistencies (generally defined as "errors") can be identified by execution of applicable rules 314 by the rule module 110 and brought to the attention of the interface controller 120 by a non-binding suggestion 116. The non-binding suggestion 116 may indicate this potential inconsistency or incomplete section, e.g., via keyword "spouse" or include more details to the interface controller 120.

According to another embodiment, the non-binding suggestion 116 involves relevancy of questions or tax topics to present to the user. For example, if the user has children, rules 114 executed by the rule module 110 may identify various topics that may be relevant to the user such as deductions for children, childcare and medical expenses. Thus, rules 114 executed by the rule module 110 can be executed to identify these errors or inconsistencies and to ensure that all applicable tax topics and forms are addressed.

According to another embodiment, the non-binding suggestion 116 generated at 520 involves a proposed priority or temporal indication of a sequence or order of questions or tax topics to present to the user. For example, the non-binding suggestion 116 may indicate that a certain tax topic or question (e.g., as identified by a keyword or other indicator), should be addressed immediately or on the spot or in connection with a currently displayed interview screen, or that multiple non-binding suggestions 116 should be aggregated for presentation to the user at the end or at a final stage of preparation or review of the electronic tax return. Further, it may be the case that one or more of these aggregated non-binding suggestions 116 is no longer valid as a result of changes made or other data entered before that time. As another example, the priority or temporal data of the non-binding suggestion 116 may indicate that a certain tax topic or question should be addressed at a later time, e.g., within the next interview screen 123 that is to be generated, or that it is not necessary to present a certain tax topic or question to the user as a result of the current runtime data 313.

According to another embodiment, the non-binding suggestion 116 generated at 520 involves a possible unanswered interview question that is identified or determined according to embodiments that analyze question context or semantic dependencies. This may involve transforming Yes-No question-and-answer flows into dependency graphs or representations that express pre-determined associations or semantic dependencies, and answers to certain questions, which indicate whether a certain unanswered question is free or unencumbered by a pre-determined semantic dependency or whether a pre-determined semantic dependency remains, is used to identify or select questions to be presented to the user or to be the subject of a non-binding suggestion 116.

More specifically, a table or directed graph may express or identify questions that are associated with one or more other questions, which defines the semantic dependency of one question upon another or upon pre-determined criteria in the form of an answer to another question. If certain questions do not depend on answers to other questions, or answers already provided satisfy pre-determined criteria (e.g., in order for Question 2 to be free of semantic dependency, the answer to Question 1 must be "yes"), then those questions do not depend on answers to other questions or are "free" or independent. These "free" or "independent" unanswered questions can be identified as a potential interview question to be asked of the user and may be the subject of a non-binding suggestion 116 generated by the rule module 110. These free or independent questions may be an "on-the-spot" questions or questions to eventually be presented by the interface controller 120 to the user immediately (e.g., during a currently displayed interview screen) in response to receiving the non-binding suggestion 116 or as determined by the interface controller 120. In this manner, the context of certain questions makes sense to a user depending on answers to certain other questions, whereas the context other questions that do not have such semantic dependency and instead are independent such that there is more flexibility in when such independent questions can be presented to the user and the order in which they are presented, e.g., in a random order given their dependency freedom, while still not being "alarming" or "surprising" to the user.

For example, FIGS. 6A-B illustrate two sequences 610, 620 of questions that are arranged in a particular pre-determined or programmed order based on respective flows 612, 622 involving "yes-no" answers to respective questions.

FIG. 6A illustrates an example flow 611a including independent, unrelated questions 612a-d are included in a pre-determined flow or sequence 611a, which may be used in certain known tax preparation applications that utilized pre-determined question-and-answer tree structures. FIG. 6B illustrates another example flow 611b including questions 612e-h that are related to other questions or to answers of other questions, which may be used in certain known tax preparation applications that utilized pre-determined question-and-answer tree structures.

FIGS. 6C-D graphically illustrate how embodiments utilize a different model, e.g., based on transformation of pre-determined question and answer flows 611a-b shown in FIGS. 6A-B into respective dependency models 621a-b identifying an unanswered question without referring to pre-determined flows and sequences 611a-b. Thus, dependency models 621 instead consider whether to select an unanswered question for a non-binding suggestion 116 and possible presentation to the user based on another data structure that indicates whether a question is semantically dependent upon an answer to at least one other question (as reflected by arrows 640a-c extending between questions in FIG. 6D.

For example, FIG. 6A illustrates a pre-determined sequence 611a of four questions 612a-d represented by respective circles: 1. Is age of user greater than 18? 2. Is user male? 3. Does user reside in California? 4. Does user have a job? These questions 612a-d are arranged in a particular sequence depending on whether an answer to a preceding question is "yes" or "no." Thus, for example, in this particular flow 611a, question 612b of "is user male?" is only asked if the user is older than 18. Similarly, in this particular flow 611a, question 612c of "does user reside in California?" is only asked if the user is older than 18 ("yes" answer to question 612a) and the user is male ("yes" answer to question 612b. Finally, in this particular flow 611a, question 612d of "does user have a job?" is only asked if the user is older than 18 ("yes" answer to question 612a), the user is male ("yes" answer to question 611*b*) and the user does not live in California ("no" answer to question 611*c*). Thus, despite these questions being unrelated and independent of each other (e.g., the age of the user has no bearing or impact on whether the user is male or female, and where the user lives has no bearing or impact on whether the user is employed), it may be that due to the pre-determined flow 611*a*, later questions in the flow 611*a* are not asked or are identified at a later time in a different flow.

FIG. 6B illustrates an example of questions having semantic dependency but that are constrained by a pre-determined flow. In FIG. 6B, the illustrated example includes four questions 611*e-h* represented by respective circles: 5. Was the user divorced? 6. Was there a divorce agreement (DA) signed? 7. Was the divorce agreement executed (E) after a certain date in 2008? 8. Was the divorce agreement executed (E) before a certain date in 1985? The questions 611*e-h* are arranged in a "yes-no" flow 611*b*. Thus, in this example, if the user is divorced, then the next question in the flow 611*b* sequence is whether there is a divorce agreement, and if so, then the next question in the flow 611*b* sequence is whether that divorce agreement was executed after a date in 2008, and if not, then the next question in the flow 611*b* sequence is whether it was executed before a date in 1985. Thus, for example, before question 611*f* of whether a divorce agreement was signed is asked, the answer to question 611*e* should first be determined, i.e., whether there was a divorce. As another example, before the questions 611*g-h* about when a divorce agreement was executed can be asked, the answer to question 611*f* of whether there is a divorce agreement should first be determined, which depends on the answer to the question 611*e* of whether there was a divorce.

FIGS. 6C-D illustrate how, according to embodiments, the particular sequences or flows 611*a-b* represented in FIGS. 6A-B are not needed or utilized, and instead, embodiments utilize dependency models 621*a-b* and rules 614 or a database or table accessed thereby that define or indicate which questions depend from certain other questions and how they depend based on answers to those other questions.

For example, referring to FIG. 6C, rules 314 or table or other data structure accessed thereby specify that Questions 611*a-d* are all independent of each other in that their subject matter does not depend on an answer to another question in the group or sequence of questions 600*a-d*, resulting in all four of these questions 600*a-d* being stand-alone, independent and unconnected circles 622*a-d*, without the yes-no flow 611*a*. Thus, these four questions 611*a-d* are free of any semantic dependency (e.g., where someone lives has no bearing on how old someone is, and whether someone has a job has no bearing on whether the user is a male or female). In this particular example, the dependency model 621*a* is that all of the questions 611*a* are free of dependency, such that no dependency links or associations 623 (as described with reference to FIG. 6D) are utilized and thus can be selected as the basis for a non-binding suggestion 116. As such, if all of questions 612*a-d* are unanswered, they may all be the subject of a non-binding suggestion 116.

Referring to FIG. 6D, rules 314 or table or other data structure accessed thereby specify semantic dependency or relationships embodied within questions 611*e-h*, and these dependencies are identified by dependency links or associations 623*a-c* extending between respective questions 611*e-h*. The links or associations 623*a-c* designate a particular question from which the link 632 extends as being semantically dependent, and specifies pre-determined criteria in the form of an answer to another question that must be satisfied in order for that particular unanswered question to be classified as an independent unanswered question or a question that is free of dependency.

For example, assume that questions 612*f-h* are unanswered questions, the dependency of unanswered question 612*f* (was there a divorce agreement?) is shown by arrow or link 623*a* to question 611*e* (was the user divorced?), and specifically, that asking the unanswered question 612*f* or generating a non-binding suggestion 116 based on unanswered question 612*f* requires pre-determined criteria in the form of an answer to the question 612*e* of whether there was a divorce being "yes." In other words, so long as the pre-determined criteria or answer to the "divorced" question 611*e* is satisfied ("yes" in the illustrated example) then the unanswered question 612*f* (DA?) is free of semantic dependency, or is independent, and can be selected as the subject of a non-binding suggestion 116. This determination is made without referring to a pre-determined tree structure or flow and instead, is made using a different model or data structure in the form of a table or directed graph that expresses the associations and pre-determined criteria independently of the sequences shown in FIGS. 6A-B. However, if the answer to that question 611*e* is "No" then the dependency of unanswered question 612*f* remains intact and is not released or changed. As a result, the unanswered question 612*f* would not qualify as being the subject of a non-binding suggestion 116 since the pre-determined criteria for releasing the semantic dependency was not satisfied.

Similarly, the dependency link 623*b* in the form of an outgoing arrow from unanswered question 612*g* (executed after a date in 2008?) to question 612*f* (DA?) indicates that the unanswered question 612*g* (E>2008?) is dependent upon an answer to the question 612*f* and will be free of dependency when the answer to the "DA?" question 612*f* is "Yes," whereas the unanswered question (E>2008) 612*g* is not free of dependency when the answer to question 612*f* is "No." As such, when the answer to question 612*f* is "Yes" (there is a divorce agreement), the rule engine 112 can select question 612*g* (was the divorce agreement (DA) executed after a certain date in 2008") as a potential question for including in or as a non-binding suggestion 116, whereas with any other answer, it is not and the dependency designation remains intact and is not changed since the pre-determined criteria for releasing semantic dependency was not satisfied.

As a final example, the dependency link 623*c* in the form of an outgoing arrow from unanswered question 612*h* (executed before a date in 1985?) to question 612*f* (DA?) indicates that the unanswered question 612*h* (E<1985?) is dependent upon an answer to the question 612*f* and will be free of dependency when the answer to the "DA?" question 612*f* is "Yes" whereas the unanswered question 611*h* (E<1985) is not free of dependency when the answer to that question 612*f* is "No." As such, when the answer is "Yes" (there was a divorce agreement signed), the pre-determined criteria has been satisfied to release the dependency, such that the rule engine 112 can select the question 612*h* (was the divorce agreement (DA) executed before a certain date in 1985") as a potential question for including in or as a non-binding suggestion 116, whereas with any other answer, it is not selected since the pre-determined criteria is not satisfied.

Thus, when a subject question has no dependency link associated therewith, or when the answer to question associated with the subject question satisfies pre-determined criteria, then that subject question is determined to be free of semantic dependency, or independent, such that the subject application can be the basis for a non-binding suggestion 116 generated by the rule module 110. Accordingly, in the illustrated examples shown in FIGS. 6C-D, only questions 611*a-d* are initially free of dependency or independent, and as runtime data 113 or answers to questions are provided by the user, the rule engine 112 eventually determines whether any additional questions 612*e-h* (in FIG. 6D) qualify as being free of dependency or independent.

Thus, for example, if the user already answered a question 612 or indicated that the user was divorced during preparation of the electronic tax return, but has not yet provided any other input such that answers 612*f-h* remain unanswered, then the same four questions 611*a-d* of FIG. 6C remain free of dependency or independent, but none of questions 611*f-h* are currently free of dependency or independent. Then, if the user responds to other questions or indicates that there was a divorce agreement (for question 612*f*), then questions 612*e* and 612*f* have been answered, and questions 612*g-h* remain unanswered and would then be classified as free of dependency or independent since, in this example, both of these unanswered questions 612*g-h* had the same pre-determined criteria of "yes" answer to question 612*f*, but it will be understood that embodiments are not so limited. Thus, having identified questions 612*a-d* and questions 612*g-h* and generating non-binding suggestions 116 based thereon, the rule module 110 can provide the non-binding suggestions 116 to the user, the interface controller 120 can determine whether and when (e.g., the sequence) the questions should be presented to the user.

According to embodiments, the semantic dependency reflected in rules 314 or in a data structure such as a table, database or directed graph accessed thereby prevent questions such as "Was a divorce agreement executed after a certain date in 2008?" 612*g* or "Was the divorce agreement executed before a certain date in 1985" 612*h* from being selected as non-binding suggestions 116 provided to the interface controller 120 before questions 612*e, f* concerning whether there was a divorce and whether there was a divorce agreement, without use of a pre-determined flow as shown in FIGS. 6A-B, such that the questions are presented to the user in a manner or sequence that is not surprising to the user.

While FIG. 6D illustrates a single dependency (a single link 623 from one question to another), embodiments may involve one or more questions that are dependent upon answers to multiple questions. One unanswered question may be associated with a single question, whereas another unanswered question may be associated with multiple other questions. Thus, embodiments may involve resolution of single or multiple pre-determined semantic dependencies, and FIG. 6D is provided to generally illustrate how embodiments operate with regard to a single dependency 623 for ease of explanation.

Referring to FIG. 7, in a method according to one embodiment, at 702, during runtime during preparation of an electronic tax return, one or more rules 314 are executed by the rule module 110, which may access a dependency table, directed graph (e.g., as described in U.S. application Ser. No. 14/097,057, previously incorporated herein by reference) or other data structure identifying questions and status of dependency of questions upon answers to one or more other questions. Thus, while the dependency table or directed graph may be generated by transforming a pre-determined sequence or flow expressed in a tree structure into a different data structure or model, embodiments do not refer to a pre-determined sequence or flow expressed in a tree structure when executing rules 114 to determine non-binding suggestions 116 and instead utilize the table or directed graph following the transformation.

At 704, during runtime, the rule module 110 performs a first scan of the table or graph to identify questions that are unanswered and have not been presented to the user. This first set of unanswered questions presents all of the possible questions that could be presented to the user and which may be the subject of a non-binding suggestion 116 eventually provided to the interface controller 120.

At 706, the rule module 110 performs dependency resolution based on the first set of identified unanswered questions as described above with reference to FIGS. 6A-D and the associated dependency links 623. For this purpose, the table or directed graph reflective of the rules indicates the dependencies such that the rule module 110 can identify each unanswered question that is independent or free of dependency on an answer to another question and each unanswered question that is dependent upon an answer to at least one other question. At 708, the unanswered questions that are identified as being free of semantic dependency during step 706 are selected and one or more non-binding suggestions 116 are generated for these selected questions.

While FIG. 7 describes one iteration of selecting unanswered questions that are free of semantic dependency or that are independent for non-binding suggestions 116, the non-binding suggestions 116 may change as additional, new or updated runtime data 113 is received at 708, resulting in updates to the table or directed graph reflective of the associated rules at 710, and updating or changing questions that have been answered and questions that remain unanswered, and those unanswered questions that are independent or free of dependency on an answer to another question.

Steps 702-710 are repeated at 712 as runtime data is received or updated. Thus, the non-binding suggestions 116 based on resolution of semantic dependency can change as runtime data 113 or answers to questions are received or determined by the rule module 110. This iterative process repeats as runtime data 113 is received, modified, updated or changed, thus resulting in iterations dependency resolutions and determinations of non-binding suggestions 116 based on same.

With the various issues that a non-binding suggestion 116 may involve, according to embodiments, the suggestion 116 is a "hint" or "recommendation" by the rule module 110 regarding what can or should be presented to the user. The non-binding suggestion 116 may involve different types and combinations of non-binding suggestions for different purposes.

For example, the non-binding suggestion 116 may be directed to identifying an error or inconsistency in the electronic tax return, another non-binding suggestion 116 may be directed to identifying a topic or section that should be presented and/or completed, whereas yet another non-binding suggestion 116 is directed to a possible priority or temporal indication of a sequence or order of questions or tax topics, and a further non-binding suggestion 116 may be directed to identifying questions that are independent or free of semantic dependency. The rule module 110 may generate various numbers of non-binding suggestions 116 of the same type or different type used to inform the UI controller 120 of different types or information or serving different purposes. Thus, embodiments provide a flexible framework that can accommodate various types of rules 314 for various types of non-binding suggestions 116 for potential action items within an electronic tax return, and do so with runtime data 113 entered or imported in an ad hoc manner, e.g., as a result of embodiments resolving semantic dependency independently of a pre-determined flow.

Depending on the type and content of the non-binding suggestion 116, the non-binding suggestion 116 can be a keyword or phrase that sufficiently identifies the question or topic since the rule module 110 is not involved in generating an interview screen 123 that incorporates content of the non-binding suggestion 116 or a question (e.g., as described above with regard to dependency resolution for example), or the non-binding suggestion 116 may have another description or instruction in the event that the non-binding suggestion 116 is selected for execution. In this regard, the rule module 110 serves as an "advisory" of what could or should be presented, but ultimately does not control the interface controller 120 or which interview screen 123 is eventually selected or the content that is incorporated into an interview screen 123 or template.

Referring again to FIG. 5, at 522, the interface controller 110 or resolution element 341 thereof receives or retrieves the non-binding result(s) or suggestions 116 generated by the rule module 110 as inputs.

According to one embodiment, step 522 involves the rule module 110 pushing one or more or all of the non-binding suggestions 116 generated thereby to the interface controller 120. As described in further detail below, the interface controller 120 proceeds to process the non-binding suggestions 116. In another embodiment, only certain or selected non-binding suggestions 116 are pushed to the interface controller 120. For example, the rule module 110 may be configured to push non-binding suggestions 116 periodically, or push certain types of non-binding suggestions 116 before others according to a pre-determined priority, or to push non-binding suggestions 116 as they are generated as "first generated first out" (FGIO), or to push them periodically.

According to one embodiment, the rule module 110 may be configured to push a non-binding suggestion 116 involving an error or inconsistency to the interface controller 120 so that the interface controller 120 can initially consider correcting the error before further non-binding suggestions 116 regarding potential topics or questions and other runtime data 113 (e.g., questions identified as being free from semantic dependency) are presented to the user. The interface controller 120 can process the non-binding suggestion 116 immediately or on the spot, e.g., the form of a message displayed with or after the currently displayed interview screen or during a next interview screen, e.g., after the user completes entry of data into a current interview screen or navigates away from the current interview screen.

According to another embodiment, step 522 involves the interface controller 110 pulling one or more non-binding suggestions 116 generated by the rule module 110 to retrieve the non-binding suggestions 116 from the rule module 110. In one embodiment, all of the non-binding suggestions 116 are retrieved by the interface controller 110, and as described in further detail below, the interface controller 120 proceeds to process the non-binding suggestions 116. In another embodiment, only certain or selected non-binding suggestions 116 are retrieved by the interface controller 120. For example, if the interface controller 120 is managing display of a current interview screen 123, the interface controller 120 may query the rule module 110 for non-binding suggestions 116 pertaining to the tax form of that current interview screen 123 or a topic that is the subject of the current interview screen 123. For this purpose, the interface controller 120 can maintain or track an identifier or indicator of a tax form regarding which topic or tax form is the subject of a current interview screen 123, e.g., by updating a flag in a table of interview screens to indicate the current interview screen and any other determined interview screens that have been identified as being presented next or in the future, and the identifier is passed as part of a query from the interface controller 120 to the rule module 110 to request non-binding suggestions 116 associated with the identifier.

As another example, the query by the interface controller 120 to the rule module 110 may be for non-binding suggestions 116 pertaining to a topic that is the subject of the prior or a recent interview screen 123 (which may not be the currently displayed interview screen).

As yet another example of an embodiment, the interface controller 120 may query the rule module 110 for non-binding suggestions 116 pertaining to topic that is the subject of the next interview screen 123 that is to be selected or generated for display, or another future interview screen 123 that is to be displayed thereafter. For these purposes, the interface controller 120 can maintain a flag database and assign flags to an interview screen 123, tax form or other object indicating which screen or form is a "current" screen or form, which one is "next," and so on. Thus, as runtime data 313 changes and new interview screens 123 are presented, flags for an interview screen 123 or tax form are updated to indicate "recent," "current," and "next" status identifiers, for example. Thus, what was once "current" or currently displayed interview screen is now "past" or "recent" and what once was the "next" interview screen is now the "current" or "past" interview screen as the interface controller 120 progresses through the various interview screens 116 forms or tax documents.

Embodiments may involve the interface controller 120 pulling non-binding suggestions or querying the rule module 110 based on what interview screen is currently displayed or will be displayed, or based on other criteria such as a temporal criteria (e.g., pulling periodically).

Embodiments may also involve a combination of push-pull methods. For example, the rule module 110 can push non-binding suggestions 116 to the interface controller 120, and if the interface controller 120 has completed processing those suggestions 116, or checks for other suggestions 116, the interface controller 120 can query the rule module 110 and pull non-binding suggestions 116 from the rule module 110.

According to another embodiment, non-binding suggestions 116 are communicated between the rule module 110 and the interface controller 120 utilizing a shared resource such as shared memory or data store. In this embodiment, a data store or portion thereof is designated to serve as shared memory for non-binding suggestions 116. Thus, as non-binding suggestions 116 are generated by the rule module 110, they can then be transmitted to and stored in the shared memory. The rule module 110 can push all of the non-binding suggestions 116 that have been generated to the shared memory, or select non-binding suggestions 116 as discussed above. They may also be pushed to the shared data store periodically or at certain times. The interface controller 120 can request a non-binding suggestion 116 from the shared memory as needed, periodically or at other times, or based on a currently displayed interview screen 123, tax form or document, and if the requested non-binding suggestion 116 is available, retrieve or read it from the shared memory.

If there is no non-binding suggestion 116 associated with the interface controller's request, the interface controller 120 can be configured to select the next non-binding suggestion 116 in the queue of the shared memory or based on other selection criteria, or request any other non-binding suggestions from the rule module 110. Thus, it may be the case that certain non-binding suggestions 116 remain in shared memory for different durations of time compared to others, and the interface controller 120 may retrieve non-binding suggestions from the rule module 110 and/or a shared resource, and such non-binding suggestions may be pushed to the interface controller 120 and/or pulled from the shared resource or rule module 110.

Referring again to FIG. 5, the rule module 110 having generated the non-binding suggestions 116, and the non-binding suggestions 116 being received or retrieved by the interface controller 120, at 524, the interface controller 120 or resolution element 341 thereof determines how non-binding suggestion(s) 116 should be processed based at least in part upon a non-binding suggestion 116 or a plurality of factors including a non-binding suggestion 116. For example, factors may involve, for example, a pre-determined priority or sequence, what is required or specified by a configuration file 350, and a form factor of a computing device utilized by the user.

For example, referring to FIG. 8, according to one embodiment, the resolution element 341 of the interface controller 120, at 802, determines data of the non-binding suggestion 116 such as a keyword or "hint" term within a pre-determined field of the non-binding suggestion 116, and utilizes that term to search a data store of configuration files 350 at 804 to determine whether a configuration file 350 includes a field with a corresponding or matching keyword. If so, the interface controller 120 proceeds to FIG. 9. If not, the interface controller 120 proceeds to FIG. 10.

Referring to FIG. 9, at 902, the interface controller 120 has identified at least one configuration file 350 corresponds to or is associated with the non-binding suggestion 116 identified based at least in part upon matching or related keywords in both the non-binding suggestion 116 and the configuration file 350. At 904, in the event that multiple configuration files 350 are identified, a configuration file 350 conflict is resolved and a configuration file 350 is selected. Configuration file 350 resolution may be based on, for example, the configuration file 350 that was created or added to the data store most recently, the configuration file 350 that was updated most recently, the configuration file 350 that was utilized most recently, or randomly selected. Configuration files 350 may also be programmed to indicate that in the event of a conflict, certain configuration files (if they may be applicable) are prioritized in such a way so as to resolve or simplify the conflict resolution. For example, a configuration file 350 may indicate that in the event of a configuration file 350 conflict, a particular configuration file 350 can be withdrawn from consideration. As another example, if configuration files 350 involve different factors or attributes such as a form factor of a computing device (e.g., screen or display area of a computer screen vs. mobile communication device) that executes the tax preparation application, the configuration file 350 for the form factor of the computing device is utilized or has priority over other configuration files 350.

At 906, the selected configuration file 350 is read or executed by the interface controller 120 to implement the requirements of the configuration file 350 concerning one or more factors such as form factor, timing or priority of content or interview screens 123, or specifying actual content to be presented to the user, and the process continues to FIG. 9. Otherwise, if a configuration file 350 is not identified, the process continues to FIG. 10.

Referring to FIG. 10, when the interface controller 120 does not identify a configuration file 350 corresponding to or associated with the received non-binding suggestion 116 at 1002, then at 1004, the generator element 342 of the interface controller 120 determines or reads the keywords, terms or phrases from the pre-determined field or payload of the non-binding suggestion 116, and at 1006, searches a data store or submits a query to the interview screen management element 343 for a visual asset 344 comprising an interview screen template corresponding to or associated with the keywords, terms or phrases. If no interview screen template is identified, such that neither a configuration file 350 nor a template can be identified, the interface controller 120 may ignore the non-binding suggestion and notify the host regarding same. Otherwise, if a visual asset 344 in the form of an interview screen template is identified, the process continues to FIG. 11.

Referring to FIG. 11, in embodiments in which a configuration file 240 or interview screen template 344 is identified at 1102, data 1104, the generator element 341 submits query to the interview screen management element 343 for visual asset(s) corresponding to the configuration file 350 or retrieves the template. Thus, in the case of a configuration file 350, the configuration file 350 may specify a visual asset 344 of a pre-programmed interview screen or sequence of interview screens, whereas when a template is to be utilized, the generator element 342 may retrieve the template from the data store to eventually populate the template with data.

At 1106, the interview screen management element 342 searches the data store or library of visual assets 344 and provides identified interview screen(s) or template(s) to generator element 341, which at 1108, uses the retrieved pre-programmed interview screens and presents them to the user via the UI 130 at 1110, or retrieves the template and populates one or more pre-determined fields or section of the interview screen template using the previously determined keywords, terms or phrases of the non-binding suggestion 116.

At 1112, the user, having been presented with the interview screen 123, responds to the question or topic by entering data into one or more fields of the interview screen, importing the data from an electronic source into one or more fields of the interview screen.

This new or updated runtime data 313 is then used to repeat process steps, and the rule module 110 processes the new or updated runtime data 313 to generate a different set of non-binding suggestions 116 (e.g., different types or numbers), and this different set of non-binding suggestions 116 is then provided as an input to the interface controller 120.

For example, FIG. 12A generally illustrates a first set of runtime data 313a provided as an input to the rule module 110, which executes rules 314 of the declarative knowledge base 310 and generates five non-binding suggestions 116 (Suggestions 1-5). These five non-binding suggestions 116 are provided as inputs to the interface controller 120, which determines whether and how to process them as described above. For example, the interface controller 120 may identify applicable configuration files 350, and based on the configuration files 350, determine that Suggestion 1 116a can be ignored and never processed, Suggestion 2 116b can be processed immediately or now (on the spot), Suggestion 3 116c can be processed at a later time, e.g., after the user enters a pre-determined time of data such as the user's income, or whether the user has children, Suggestion 4 116d can be processed after Suggestion 3 (as a result of priority or dependency), and Suggestion 5 116*e* can be delayed for processing as part of a final review (e.g., this suggestion may not be applicable depending on other data entered, or is not critical to be addressed immediately).

Referring to FIG. 12B, the user then enters data in response to the questions or topics presented in interview screen(s) 123 generated by the interface controller, e.g., for Suggestion 2, which results in updated runtime data 313*b* that is provided to the rule module 110. The rule module 110 executes rules 314 of the declarative knowledge base 310 and generates a second set of non-binding suggestions 116 based on the second runtime data 313*b*: Suggestions 1 and 5-6. These three suggestions 116*a* and 116*e-f* are provided as inputs to the interface controller 120, which determines whether and how to process the suggestions 116*a*, 116*e-f*, if they are processed. For example, as discussed above, the interface controller may identify applicable configuration files 350, and based on the configuration files 350, determine that Suggestion 5 116*e*, similar to before, can be delayed for processing as part of a final review, Suggestion 6 116*f* can be processed immediately or now (on the spot), and Suggestion 1 116*a* can be ignored (similar to before with runtime data 313*a* in this example).

Thus, FIGS. 12A-B are provided to generally illustrate that non-binding suggestions 116 generated by the rule module 110 can change during runtime in response to the current runtime data 313, the numbers and types of non-binding suggestions 116 can change, and the resulting interview screens 123 that are selected for presentation to the user based on the selected configuration files 240 and/or templates can also change. Thus, this on the fly adjustment or adaptation to runtime data 313 allows embodiments to generate different non-binding suggestions 116 and to accommodate data received at different times (e.g., ad hoc data entry), while not relying upon a fixed, pre-determined question and answer tree structure. In this manner, embodiments that utilize a declarative knowledge base 310 and a dedicated rule module 110 loosely coupled to the interface controller 120 provides an interview engine of a tax preparation application that is adaptive to changes in runtime data, and can be readily modified by changing or updating terms of a data schema, rules, configuration files, templates and visual assets, without dealing with restrictions of pre-determined question and answer tree structures. Further, given the manner in which a declarative knowledge base 310, rule engine 110 and interface controller 120 are utilized, embodiments do not rely upon pre-determined sequences or tree structures, and instead, can implement different sequences, e.g., as specified by a configuration, pre-determined priority, or a random sequence as determined by a random sequence or number generator, such that the sequence of interview screens ultimately presented to the user is not known or determined beforehand and instead is determined during runtime during preparation of an electronic tax return.

Referring to FIG. 13, in a system 1300 constructed according to another embodiment, the system 1300 includes components described above (descriptions of which are not repeated), and further includes at least one additional modular component. In the illustrated embodiment, the at least one additional modular component 1310 is added so as to be in communication with or between the rule module 110 and the interface controller 120 and serves as an extension of the system framework described above to process, filter or modify non-binding suggestions 116 generated by the rule module 110 (generally, "processed" non-binding suggestions indicated by 116*p*).

For example, the at least one additional modular component 1310 may serve to establish a priority or score the relevancy of non-binding suggestions 116 generated by the rule module 110, or select certain non-binding suggestions 116 to be processed, which may involve modifying content (e.g., keywords, terms, phrases or other descriptions) of the non-binding suggestion 116, and this priority, relevancy or modified non-binding suggestion 116*p* is then provided to interface controller 120. The interface controller 120 determines whether and how to proceed with the processed nonbinding suggestion 116*p*.

Referring to FIG. 14, in a system 1400 according to one embodiment, a modular component 1310 is a personalization agent 1410, which serves to provide a level of personalization or customization to the non-binding suggestions 116 to reflect attributes of the user or user's electronic tax return. In the illustrated embodiment, the personalization module 1410 accesses or is in communication with one or more data stores or databases 1421*a*, *b* including data of electronic tax returns of other users of the tax preparation application ("real life knowledge" in FIG. 14) and/or statistics about other users or taxpayers ("statistical knowledge" in FIG. 14).

Electronic tax return data of other users 1421*a* is real life tax data that goes beyond tax compliance. Attributes of the current user such as occupation, geographic data, demographic data, income and deductions, marital status, etc. are used to identify other users that share one or more of these attributes with the current user, e.g., to identify other users or taxpayers that are in a similar financial, tax or life situation as the current user, or have some other common or shared attribute or characteristic. Once these other users or tax returns thereof are identified, the tax data of those other users is used to generate or process non-binding suggestions 116. Further details regarding how a personalization module 1410 may be utilized are described with reference to FIGS. 15-16.

Referring to FIG. 15, steps 1502-1508 are described above with reference to other figures and various details are not repeated. In summary, the rule module 110 receives runtime data 313 and data of tax knowledge base 310, executes a query for additional runtime data as necessary (e.g., for particular electronic tax return data or for result of tax calculation), and executes at least one rule 314 using runtime data 313 to generate one or more non-binding suggestions 116. According to embodiments, at 1510, the personalization module 1410 receives one or more non-binding suggestion(s) 116 as input and at 1512, processes one or more of the non-binding suggestion(s) 116.

Referring to FIG. 16, processing of the one or more non-binding suggestions 116 by the personalization module 1410 may comprise, at 1602, the personalization module 1410 accessing one or both databases 1421*a,b* for tax return data of other users ("real life knowledge) and tax statistics ("statistical knowledge"), and at 1604, determines tax data or attributes of user of tax preparation application. At 1606, the personalization module 1410 identifies tax data of other users having attribute matching current user and/or tax data statistics, and at 1608, the non-binding suggestion(s) 116 generated by the rule module 110 are filtered, prioritized or modified.

For example, step 1608 may involve the personalization module 1410 determining that based on electronic tax returns of other users sharing attributes with the current user, that certain non-binding suggestions 116 will not yield meaningful input, such that these non-binding suggestions 116 are filtered or assigned a lower priority than other non-binding suggestions 116. This may be based at least in part upon, for example, the topic or question that is the subject of the non-binding suggestion not being the topic or question that was addressed in another user's electronic tax return. The non-binding suggestion 116, such as the text or description of the suggestion or a keyword or identifier or text of the suggestion's payload, may be modified. For example, rather than a non-binding suggestion 116 for "deductions" the personalization module 1410, may modify the suggestion description or payload thereof to refer to "mortgage interest" or "property tax" deductions for the user determined to be a homeowner and other users sharing attributes of the current user also entered data for a mortgage and property tax. As another example, given the user's age, tax statistics may indicate that users of that age or within an age group are more likely to own a house rather than rent, in which case the personalization module can modify keywords or text of the non-binding suggestion 116 to reflect more specific deductions such as "mortgage interest" or "property tax" deductions. Thus, the personalization module leverages electronic tax return data of others and/or tax statistics generally, to provide a more personalized description about the nature of the non-binding suggestion 116.

Referring again to FIG. 15, at 1514, non-binding suggestions 116, which may be those that are generated by the rule module 110 and not processed by the personalization module 1410 and/or those that are processed by the personalization module 1410, are received or retrieved by the interface controller 120. As discussed above, this may involve the rule module 110 or personalization module 1410 pushing the non-binding suggestions 116 to the interface controller 120, the interface controller 12—requesting or pulling non-binding suggestions 116 from the personalization module 1410 and/or rule module 110, or both, or use of a shared memory system utilized by the interface controller 120, rule module 110 and personalization module 1410.

At 1516, the interface controller 120 or resolution element 341 thereof determines how non-binding suggestion(s) 116 should be processed which, as described above, may involve one or more factors such as priority, timing, whether to process a suggestion 116, a configuration file 350, form factor and processing of the non-binding suggestion 116 by the personalization module 1410.

FIG. 17 generally illustrates certain components of a computing device 1700 that may be utilized to execute or that may embody components of embodiments. For example, the computing device may include a memory 1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments have been described with reference to the rule module 110 performing resolution of push dependency of questions and determining which questions are independent or free of dependency such that they can be selected as non-binding suggestions 116, embodiments are not so limited since resolution of semantic dependency may also be performed by the interface controller 120, or another separate modular component of the system as described with reference to FIG. 13.

Further, while certain embodiments have been described with reference to resolution of semantic dependency with reference to system components and configurations described and illustrated with reference to FIG. 3, for example, as involving a rule module 110 and an interface controller 120, embodiments are not so limited since, referring to FIG. 18, in another system 1800 embodiment, various types of interview engines 1810 of tax preparation applications may include a module or engine 1812 for performing semantic dependency resolution, such that descriptions of embodiments with reference to system components shown in FIG. 3 are provided as non-limiting examples of how embodiments may be implemented. Thus, referring to FIG. 18, in a system 1800 constructed according to one embodiment, the interview engine 1810 of a tax preparation application embodies a module or engine 1812 for performing resolution of semantic dependencies using semantic dependency rules 114/1814, which may call on a table, directed graph or other data structure reflecting which questions have been answered with runtime data 113 to identify questions that are free of dependency or that are independent as candidate questions that could be asked or to identify questions to ask next or at another pre-determined time and that can be the subject of a suggestion 116/1816. Depending on the tax preparation application utilized, result generated by the interview engine 1810 may be a nonbinding suggestion 116 as illustrated, or the result 1816 may be a requirement regarding which question to present next. Thus, the result may be non-binding or binding/required.

Thus, it will be understood that embodiments involving or directed to resolution of semantic dependency may involve identifying questions that are to be presented to the user. Accordingly, it will be understood that embodiments involving resolution of semantic dependency can be utilized across different tax preparation application platforms, including those that do not utilize non-binding suggestions or related system components.

Further, while embodiments involving resolution of semantic dependency have been described with reference to an interview engine of a tax preparation application, embodiments may also be applied to other types of interview engines and on-line question and answer systems.

Additionally, while certain embodiments have been described individually, other embodiments may involve a combination of those individually described embodiments. For example, embodiments may involve combinations involving generation of non-binding suggestions by a rule module and processing by an interface controller together with embodiments directed to identifying errors or inconsistencies, a combination involving generation of non-binding suggestions by a rule module and processing by an interface controller together with embodiments directed to resolving semantic dependencies, a combination involving generation of non-binding suggestions by a rule module and processing by an interface controller together with embodiments directed to identifying errors or inconsistencies and processing by an interface controller together with embodiments directed to resolving semantic dependencies, a combination involving identifying errors or inconsistencies and resolving semantic dependencies.

Further, while multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method, the method comprising:
   receiving, by a modular rule engine of computer-executable instructions stored in a non-transitory memory and executed by at least one processor in communication with a shared data store comprising a plurality of configuration files, runtime data generated at least in part through calculations performed by a modular calculation engine of the at least one processor and a plurality of rules from the shared data store, wherein the at least one processor is configured to execute the computer-executable instructions stored in the memory, and wherein the at least one processor is configured to provide one or more interview screens for interaction by a user;
   executing, by the modular rule engine, at least one of the plurality of rules utilizing the runtime data to generate a result comprising a non-binding suggestion of possible content for presentation to a user of an application, the at least one rule specifying respective comparisons of the runtime data and data within predetermined fields of an output being prepared using the application to identify a possible error or inconsistency within the output or the runtime data, the executing of the at least one rule including:
      identifying at least one element of the runtime data to which the at least one rule applies;
      determining whether the identified at least one element triggers the at least one rule;
      determining at least one change to the at least one element to satisfy the triggered at least one rule; and
      selecting or generating the possible content corresponding to the at least one change;
   receiving, by a modular interface controller of the computer-executable instructions executed by the at least one processor, the non-binding suggestion generated by the modular rule engine as an input;
   determining, by the modular interface controller, whether to accept the non-binding suggestion;
   in response to determining to accept the non-binding suggestion, selecting, by the modular interface controller, a configuration file based at least in part upon the non-binding suggestion;
   executing, by the modular interface controller, the configuration file selected based at least in part upon the non-binding suggestion;
   determining, by the modular interface controller, content of a computer generated interactive interview screen for display to the user based at least in part upon execution of the configuration file that was selected by the modular interface controller without the modular interface controller referring to a pre-determined question-and-answer hierarchical tree structure or a pre-determined sequence of questions wherein the non-binding suggestion generated by the modular rule engine and communicated to the modular interface controller does not control the modular interface controller determining the computer generated interactive interview screen content; and
   presenting, by the modular interface controller, the computer generated interactive interview screen including the determined content to the user through a display in communication with the at least one processor.

2. The method of claim 1, the shared data store comprising rules and data of a first schema specifying terms, the rules reciting respective conditions involving respective terms of the first schema.

3. The method of claim 2, accessing the shared data store comprising the modular rule engine accessing a declarative knowledge base defining terms and rules applicable to respective terms.

4. The method of claim 2, further comprising:
   receiving, by the at least one processor, the runtime data comprising data of a second schema and transforming the data of the second schema into data of the first schema, and
   receiving, by the modular rule engine, the converted runtime data in the first schema.

5. The method of claim 4, receiving data of the second schema comprising receiving, by the at least one processor, a photograph of a document, further comprising the at least one processor processing the photograph to extract data in the second schema.

6. The method of claim 1, wherein the non-binding suggestion is based at least in part upon the modular rule engine executing rules specifying respective dependencies of respective potential questions, wherein a question is selected by the modular rule engine for a non-binding suggestion when the modular rule engine determines that the selected question is determined to be free of dependency upon another possible question.

7. The method of claim 1, wherein the computer generated interactive interview screen content is determined based at least in part upon a plurality of factors comprising:
 a configuration file selected based at least in part upon the non-binding suggestion, and
 a form factor of the display.

8. The method of claim 7, the plurality of factors comprising a priority factor indicating a pre-determined non-binding suggestion having priority over at least one other non-binding suggestion such that the pre-determined non-binding suggestion is processed by the modular interface controller to select a configuration file before the at least one other non-binding suggestion is processed by the modular interface controller.

9. The method of claim 1, further comprising:
 processing at least one non-binding suggestion generated by the modular rule engine by a personalization module of the computer-executable instructions executed by the at least one processor; and
 receiving, by the modular interface controller, the at least one processed non-binding suggestion from the personalization module.

10. The method of claim 9, further comprising accessing, by the personalization module, the shared data store comprising statistical data of other users, and processing, by the personalization module, at least one non-binding suggestion generated by the modular rule engine based at least in part upon the statistical data before the at least one processed non-binding suggestion is provided to the modular interface controller.

11. A system comprising:
 a shared data store comprising a plurality of configuration files;
 a non-transitory memory storing computer-executable instructions executable by at least one processor and configured to generate interactive interview screens; and
 the at least one processor in communication with the shared data store, the at least one processor being configured to execute the computer-executable instructions and thereby:
  receive, by a modular rule engine of the computer-executable instructions executed by the at least one processor, runtime data generated at least in part through calculations performed by a modular calculation engine of the at least one processor and a plurality of rules from the shared data store;
  execute, by the modular rule engine, at least one of the plurality of rules utilizing the runtime data to generate a result comprising a non-binding suggestion of possible content for presentation to a user of an application, the at least one rule specifying respective comparisons of the runtime data and data within pre-determined fields of an output being prepared using the application to identify a possible error or inconsistency within the output or the runtime data, the executing of the at least one rule including:
   identifying at least one element of the runtime data to which the at least one rule applies;
   determining whether the identified at least one element triggers the at least one rule;
   determining at least one change to the at least one element to satisfy the triggered at least one rule; and
   selecting or generating the possible content corresponding to the at least one change;
  receive, by a modular interface controller of the computer-executable instructions executed by the at least one processor, the non-binding suggestion generated by the modular rule engine as an input;
  determine, by the modular interface controller, whether to accept the non-binding suggestion;
  in response to determining to accept the non-binding suggestion, select, by the modular interface controller, a configuration file based at least in part upon the non-binding suggestion;
  execute, by the modular interface controller, the configuration file selected based at least in part upon the non-binding suggestion;
  determine, by the modular interface controller, content of a computer generated interactive interview screen for display to the user based at least in part upon execution of the configuration file that was selected by the modular interface controller without the modular interface controller referring to a pre-determined question-and-answer hierarchical tree structure or a pre-determined sequence of questions wherein the non-binding suggestion generated by the modular rule engine and communicated to the modular interface controller does not control the modular interface controller determining the computer generated interactive interview screen content; and
  present, by the modular interface controller, the computer generated interactive interview screen including the determined content to the user through a display in communication with the at least one processor.

12. The system of claim 11, the shared data store comprising rules and data of a first schema specifying terms, the rules reciting respective conditions involving respective terms of the first schema.

13. The system of claim 12, wherein the at least one processor is configured to access the shared data store by a process comprising the modular rule engine accessing a declarative knowledge base defining terms and rules applicable to respective terms.

14. The system of claim 12, wherein the at least one processor is further configured to:
 receive the runtime data comprising data of a second schema and transform the data of the second schema into data of the first schema, and
 receive, by the modular rule engine, the converted runtime data in the first schema.

15. The system of claim 14, wherein the at least one processor is configured to receive data of the second schema by a process comprising receiving a photograph of a document, and wherein the at least one processor is further configured to process the photograph to extract data in the second schema.

16. The system of claim 11, wherein the non-binding suggestion is based at least in part upon the modular rule engine executing rules specifying respective dependencies of respective potential questions, wherein a question is selected by the modular rule engine for a non-binding suggestion when the modular rule engine determines that the selected question is determined to be free of dependency upon another possible question.

17. The system of claim 11, wherein the computer generated interactive interview screen content is determined based at least in part upon a plurality of factors comprising:
   a configuration file selected based at least in part upon the non-binding suggestion, and
   a form factor of the display.

18. The system of claim 17, the plurality of factors comprising a priority factor indicating a pre-determined non-binding suggestion having priority over at least one other non-binding suggestion such that the pre-determined non-binding suggestion is processed by the modular interface controller to select a configuration file before the at least one other non-binding suggestion is processed by the modular interface controller.

19. The system of claim 11, wherein the at least one processor is further configured to:
   process at least one non-binding suggestion generated by the modular rule engine by a personalization module of the computer-executable instructions executed by the at least one processor; and
   receive, by the modular interface controller, the at least one processed non-binding suggestion from the personalization module.

20. The system of claim 19, wherein the at least one processor is further configured to access, by the personalization module, the shared data store comprising statistical data of other users, and process, by the personalization module, at least one non-binding suggestion generated by the modular rule engine based at least in part upon the statistical data before the at least one processed non-binding suggestion is provided to the modular interface controller.

* * * * *